US010015688B2

(12) United States Patent
Heikkilä et al.

(10) Patent No.: US 10,015,688 B2
(45) Date of Patent: Jul. 3, 2018

(54) TECHNIQUE FOR MONITORING DATA TRAFFIC

(71) Applicant: Telefonaktiebolaget L M Ericsson (publ), Stockholm (SE)

(72) Inventors: Gunnar Heikkilä, Gammelstad (SE); András Rácz, Budapest (HU); András Veres, Budapest (HU)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 246 days.

(21) Appl. No.: 14/652,354

(22) PCT Filed: Dec. 17, 2012

(86) PCT No.: PCT/EP2012/075761
§ 371 (c)(1),
(2) Date: Jun. 15, 2015

(87) PCT Pub. No.: WO2014/094818
PCT Pub. Date: Jun. 26, 2014

(65) Prior Publication Data
US 2015/0350938 A1    Dec. 3, 2015

(51) Int. Cl.
*H04W 24/08*    (2009.01)
*H04L 12/26*    (2006.01)

(52) U.S. Cl.
CPC ............. *H04W 24/08* (2013.01); *H04L 43/50* (2013.01)

(58) Field of Classification Search
None
See application file for complete search history.

(56) References Cited

U.S. PATENT DOCUMENTS

| 7,002,960 | B1 * | 2/2006 | Golan | H04L 12/5695 370/393 |
| 8,369,272 | B2 * | 2/2013 | Barbaresi | H04L 67/322 370/329 |
| 8,918,098 | B2 * | 12/2014 | Rivera | H04L 63/00 370/252 |
| 2002/0167911 | A1 * | 11/2002 | Hickey | H03L 7/00 370/252 |

(Continued)

FOREIGN PATENT DOCUMENTS

WO    WO 2012/058320 A1    5/2012

OTHER PUBLICATIONS

International Search Report and Written Opinion of the International Searching Authority, PCT International Application No. PCT/EP2012/075761, dated Mar. 1, 2013.

(Continued)

*Primary Examiner* — Ayaz R Sheikh
*Assistant Examiner* — Tarell A Hampton
(74) *Attorney, Agent, or Firm* — Sage Patent Group

(57) ABSTRACT

A technique that assists in identifying services for monitoring data traffic in a communication network is provided. The communication network includes a terminal configured to transceive data traffic and a component configured to measure data traffic. As to a method aspect of the technique, the terminal associates one or more communication services that are executed or executable at the terminal with one or more communication endpoints. The terminal further sends a service identification report indicative of the association to the component.

8 Claims, 11 Drawing Sheets

(56) References Cited

U.S. PATENT DOCUMENTS

| | | | |
|---|---|---|---|
| 2003/0097439 A1* | 5/2003 | Strayer | H04L 51/34 709/224 |
| 2003/0223367 A1* | 12/2003 | Shay | H04L 43/106 370/231 |
| 2004/0076187 A1* | 4/2004 | Peled | H04L 12/2852 370/514 |
| 2004/0199635 A1* | 10/2004 | Ta | H04L 41/0893 709/226 |
| 2005/0073961 A1* | 4/2005 | Paik | H04L 12/2697 370/252 |
| 2005/0207387 A1* | 9/2005 | Middleton | H04J 3/0664 370/347 |
| 2006/0013263 A1* | 1/2006 | Fellman | H04J 3/0638 370/503 |
| 2006/0268713 A1* | 11/2006 | Lundstrom | H04L 47/10 370/235 |
| 2006/0274791 A1* | 12/2006 | Garcia | H04L 43/0864 370/508 |
| 2007/0242616 A1* | 10/2007 | Chang | H04L 43/0858 370/252 |
| 2007/0253365 A1* | 11/2007 | Hedberg | H04L 43/08 370/329 |
| 2007/0268938 A1* | 11/2007 | Dowd | H04J 3/0673 370/509 |
| 2008/0285475 A1* | 11/2008 | Menditto | G06Q 30/0283 370/252 |
| 2008/0317241 A1* | 12/2008 | Wang | H04M 9/082 379/406.11 |
| 2009/0144410 A1* | 6/2009 | Fink | H04L 63/1425 709/224 |
| 2009/0227251 A1 | 9/2009 | Lei et al. | |
| 2011/0055388 A1* | 3/2011 | Yumerefendi | G06F 11/3409 709/224 |
| 2011/0314145 A1* | 12/2011 | Raleigh | H04L 41/0893 709/224 |
| 2011/0319115 A1 | 12/2011 | Rácz | |
| 2012/0030331 A1* | 2/2012 | Karampatsis | H04L 41/0893 709/223 |
| 2012/0072575 A1* | 3/2012 | King | G06F 11/3476 709/224 |
| 2012/0137343 A1* | 5/2012 | Uchida | G06F 21/6245 726/1 |
| 2012/0215911 A1* | 8/2012 | Raleigh | H04L 12/14 709/224 |
| 2012/0317276 A1* | 12/2012 | Muniraju | H04L 41/14 709/224 |
| 2013/0077491 A1* | 3/2013 | Cherian | H04W 28/10 370/235 |

OTHER PUBLICATIONS

3GPP, Technical Specification, "3rd Generation Partnership Project; Technical Specification Group Services and System Aspects; Telecommunication management; Subscriber and equipment trace; Trace concepts and requirements (Release 11)", 3GPP TS 32.421 V11.4.0 (Sep. 2012), 37 pp.

3GPP, Technical Specification, "3rd Generation Partnership Project; Technical Specification Group Services and System Aspects; Telecommunication management; Subscriber and equipment trace; Trace control and configuration management (Release 11)", 3GPP TS 32.422 V11.5.0 (Sep. 2012), 124 pp.

Johansson et al., Minimization of Drive Tests in 3GPP Release 11, *IEEE Communications Magazine*, Nov. 2012, pp. 36-43.

* cited by examiner

TECHNIQUE FOR MONITORING DATA TRAFFIC

CROSS REFERENCE TO RELATED APPLICATION

This application is a 35 U.S.C. § 371 national stage application of PCT International Application No. PCT/EP2012/075761, filed on 17 Dec. 2012, the disclosure and content of which is incorporated by reference herein in its entirety. The above-referenced PCT International Application was published in the English language as International Publication No. WO 2014/094818 A1 on 26 Jun. 2014.

TECHNICAL FIELD

The present disclosure relates to data communication in a network. In particular, and without limitation, the disclosure relates to a technique that assists monitoring data traffic in a mobile communication network.

BACKGROUND

The increasing functionality and processing power of terminals, including mobile terminals such as smartphones and tablet computers and collectively referred to as User Equipment (UE), has led to a plethora of different services ranging from ordinary voice calls to advanced "app"-based services. While telecommunication networks have been transformed to packet-switched networks, which group all transmitted data irrespective of content into suitably sized packets, the different services largely differ in Quality of Service (QoS) requirements. Some services have limited interaction with the network, while others need a stable and/or high-performance network to be useful for terminal users. Such usefulness is sometimes measured by defining a Quality of Experience (QoE) or Perceived Quality of Service (PQoS) function.

Conventional means for network operators to measure performance on the network side include counters. The counters provide an overview of the network status, such as the average throughput for a given class of Radio Bearer (RB). For example, a certain class of RB may be used for a certain type of data traffic with associated QoS requirements. The RB class thus defines appropriate settings of network parameters on a Data Link Layer and a Physical Layer of the network. However, to meet QoE requirements, network operators have to survey the QoS over the entire communication link. In a mobile communication network, such an end-to-end QoS includes, and is not limited to, a radio interface of the network.

Furthermore, different services can share one RB, for example because the number of RBs that can be simultaneously set-up is limited by the network. Consequently, network-related counters do not differentiate network usage or network performance by different applications. The network counters thus provide a system overview, but it is often difficult to identify more fine-grained usage problems, which are hidden by the counter aggregation.

More fine-grained conventional techniques for monitoring data traffic, such as Deep Packet Investigation (DPI, also known as Deep Packet Inspection) often cannot associate an investigated data packet with a particular application executed by the UE, for example due to encryption of the data packet or because the DPI algorithm has not yet been updated to recognize data packets of a recently revised or published application.

In the context of network Operation, Administration and Maintenance (OAM), company publication "Creanord EchoNEWS", July 2009, suggests introducing a Service-VLAN Identifier (S-VID) into Medium Access Control (MAC) frames for end-to-end service monitoring. However, the introduced data scales with the monitored traffic volume and adds to the network traffic, and introducing the S-VID can increase a latency of the data traffic.

Another approach deploys software agents in the UE for measuring different aspects of usage and for reporting measurement results back to the network operators. Such agents are in a position that allows measuring a UE-internal status, for instance a battery level, which is not accessible to the network. However, even within the UE, it might be technically difficult to measure the network performance of other applications, since accessing the terminal is normally limited by construction of an operating system running on the UE, Application Programming Interfaces (APIs), or data security mechanisms. Typically, the APIs of the UE provide access to UE-related metrics, such as location, battery level and event signals. The agent has no access to detailed measurements regarding other applications executed in the UE.

One might consider standardizing certain measurements which the UE is required to report to the network. Such measurements could enhance the network operator's view of the UE and its service operation. However, standardization of application-specific UE-related metrics takes a long time, often several years. It is thus difficult to keep up with the rapid evolution of new services and their usage pattern. Metrics defined by a standard might be obsolete or less useful, once implemented.

SUMMARY

It is an object underlying the present disclosure to provide a technique that allows differentiating at least certain classes of rapidly changing applications in monitoring data traffic.

According to one aspect, a method of identifying services for monitoring data traffic in a communication network including a terminal configured to transceive data traffic and a component configured to measure data traffic is provided. The method comprises the steps performed by the terminal of associating one or more communication services executed or executable at the terminal with one or more communication endpoints; and sending, to the component, a service identification report indicative of the association.

Based on the association indicated by the service identification report, at least some realizations enable the component that monitors data traffic or another component to associate the monitored data traffic to the one or more communication services. For example, a statistical analysis of the monitored data traffic can differentiate at least different classes of communication services. Use cases of the present disclosure include efficient localization of errors or bottlenecks in the communication network and customer support as to bandwidth-efficient or cost-efficient usage of mobile services.

The transceiving may encompass at least one of transmitting and receiving. A datagram, for example a data packet, which is transceived by the terminal and/or measured by the component, may be indicative of the one or more communication endpoints, for example in a header field of the datagram. An indication of the associated communication service may be absent at least in the header field of the datagrams transceived by the terminal and/or measured by the component.

The communication service may be a process, for example a network process such as a client process of a service using the network. The communication service may include one or more processes. The process may include one or more threads. The association may be triggered or detected in one or more binding events of binding the one or more communication services to the one or more communication endpoints. The communication service may relate to a specific functionality, including but not limited to voice calls, video calls, web browsing, electronic mail and remote control. The specific functionality may involve the client process at the terminal as a first endpoint and an associated server process, e.g. at a remote server as the second endpoint.

The service identification report may indicate the one or more communication ends points by means of a network address of the terminal and/or a peer network address. Alternatively or in addition, at least one of the one or more communication endpoints may be indicated by at least one of a network address and a network port.

The one or more communication endpoints may include a communication endpoint at the terminal or a remote endpoint configured for communication with the terminal via the communication network, for example another terminal within the communication network. A pair of communication end points may be associated with at least one of the one or more communication services. The service identification report may further be indicative of a communication protocol used by the associated communication service.

The association may be performed by an operating system of the terminal or by means of Application Programming Interfaces of the operating system. At least one of the communication endpoints may be a network socket (e.g., an endpoint of an inter-process communication flow across the network). The association may include binding one or more local network sockets and/or one or more remote network sockets to at least one of the communication services. The network socket may be associated in the Transport Layer implementation at the terminal. Network equipment such as routers and switches do not require implementations of the Transport Layer, as they may operate on the Link Layer level (such as some switches) or at the Internet Layer (such as some routers). The component for measuring data traffic may investigate datagrams on the Transport Layer.

The service identification report may, for each of the associated one or more communication services, indicate at least one of a socket pair associated with the communication service, a communication protocol used by the communication service, and a name for the communication service. In some implementations, only one communication service may be associated to a given combination of the socket pair and the communication protocol.

A plurality of local communication endpoints may be successively associated with one or more communication services at the terminal. Additionally, or as an alternative, plurality of communication services may be successively associated with one or more local communication endpoints. Information as to the association may be collected at the terminal prior to sending the service identification report based on the collected information towards the network.

The service identification report may further include, for each of the communication services, an association timestamp indicative of the time of the association event at the terminal. The service identification report or a separate time reference report may be sent to the component. The report may include a sending time provided by a clock of the terminal.

A service packet report may be sent to the network component. The service packet report may include packet timestamps indicative of at least one of incoming time and outgoing time of data packets at the terminal. Separate service packet reports may be sent for different communication services. For each of a plurality of data packets of the communication service, at least one of the packet timestamp and/or a hash value of the data packet may be collected prior to sending the service packet report including the collected packet timestamps and hash values. The hash value may be computed based on key fields included in the data packet according to the communication protocol used by the communication service. In some implementations, the packet timestamps and/or the hash values are encoded in the service packet report based on differences between subsequent packet timestamps and/or key fields.

According to another aspect, a method of identifying services for monitoring data traffic in a communication network including a terminal configured to transceive data traffic and a component configured to measure data traffic is provided. The method comprises the steps, performed by the component, of receiving from the terminal a service identification report indicative of an association of one or more communication services executed or executable at the terminal with one or more communication endpoints; and associating measured data traffic to one or more of the communication services based on the service identification report.

At least one of a sending socket, a destination socket, a socket pair and a communication protocol may be derived from the measured data traffic and compared to the service identification report to identify the associated one or more communication services.

A service packet report may be received from the terminal. The service packet report may include packet timestamps indicative of at least one of incoming time and outgoing time of data packets at the terminal for one of the communication services. Outgoing time of data packets at the component and/or incoming time of data packets at the component may be correlated with the reported packet timestamps. At least one of delay, jitter and packet loss may be measured based on the correlation.

At least one of the service identification report, the service packet report and a separate time reference report may be received from the terminal. The report may include a sending time. At least one of association timestamps included in the service identification report and packet timestamps included in the service packet report may be adjusted based on a time difference between a receipt time at the component and the sending time reported by the terminal. The adjustment may include compensating for at least one of an estimated time lag between sending and receipt and a difference in the clock at the terminal and a clock at the component.

At least one of the terminal and a component in a Radio Access Network of the network may measures delay or jitter in a Data Link Layer. The measured data may be analyzed and/or reported separately for each service identified based on the service identification report.

According to still another aspect, a computer program product is provided. The computer program product comprises code portions for performing one or more of the steps of at least one of the method aspects described herein when the computer program product is executed on one or more computer devices. The computer program product may be stored on a computer-readable recording medium such as a permanent or re-writable memory. The computer program product may also be provided for download by a one or more computer networks, such as the Internet, a cellular telecommunications network, or a wireless or wired Local Area Network.

According to a further aspect, an agent for identifying services for monitoring data traffic in a communication network including a terminal configured to transceive data traffic and a component configured to measure data traffic is provided. The agent comprises an associating module adapted to associate one or more communication services executed or executable at the terminal with one or more communication endpoints; and a sending module adapted to send, to the component, a service identification report indicative of the association. The agent may be installed at the terminal.

According to a still further aspect, a device for identifying services for monitoring data traffic in a communication network including a terminal configured to transceive data traffic and a component configured to measure data traffic is provided. The device comprises a receiving module adapted to receive, from the terminal, a service identification report indicative of an association of one or more communication services executed or executable at the terminal with one or more communication endpoints; and an associating module adapted to associate measured data traffic to one or more of the communication services based on the service identification report. The device may be installed at the component.

BRIEF DESCRIPTION OF THE DRAWINGS

Further aspects and advantages of the technique presented herein will become apparent from the following description of preferred embodiments and associated drawings, wherein FIG. 1 schematically illustrates an embodiment of a system environment for implementing a terminal and a network according to the present disclosure.

DETAILED DESCRIPTION

In the following description of preferred embodiments, for purposes of explanation and not limitation, specific details are set forth, such as particular signal processing components and sequences of steps, in order to provide a thorough understanding of the present invention. It will be apparent to one of skill in the art that the technique described herein may be practiced in other embodiments that depart from these specific details. For example, while the following embodiments are primarily described in terms of a terminal and a network in radio communication forming a mobile communication network, the present invention can also be implemented using any other node of the network that does not necessarily terminate a communication link. For example, the terminal can forward user data received from the network to another device, e.g., by means of Near Field Communication (NFC). Furthermore, while the following embodiments implement the technique within existing nodes or components of a communication network, the technique can also be implementing partially or completely relying on one or more dedicated nodes or components.

Moreover, those skilled in the art will appreciate that the services, components, functions and steps explained herein may be implemented using software functioning in conjunction with a programmed microprocessor, an Application Specific Integrated Circuit (ASIC), a Digital Signal Processor (DSP) or a general purpose computer. It will also be appreciated that, while the following embodiments are primarily described in context with methods and devices, that the invention may also be embodied in a computer program product as well as in a system comprising a processor and a memory coupled to the processor, wherein the memory is encoded with one or more programs that may perform the services, components, functions and steps disclosed herein.

Figure 1:
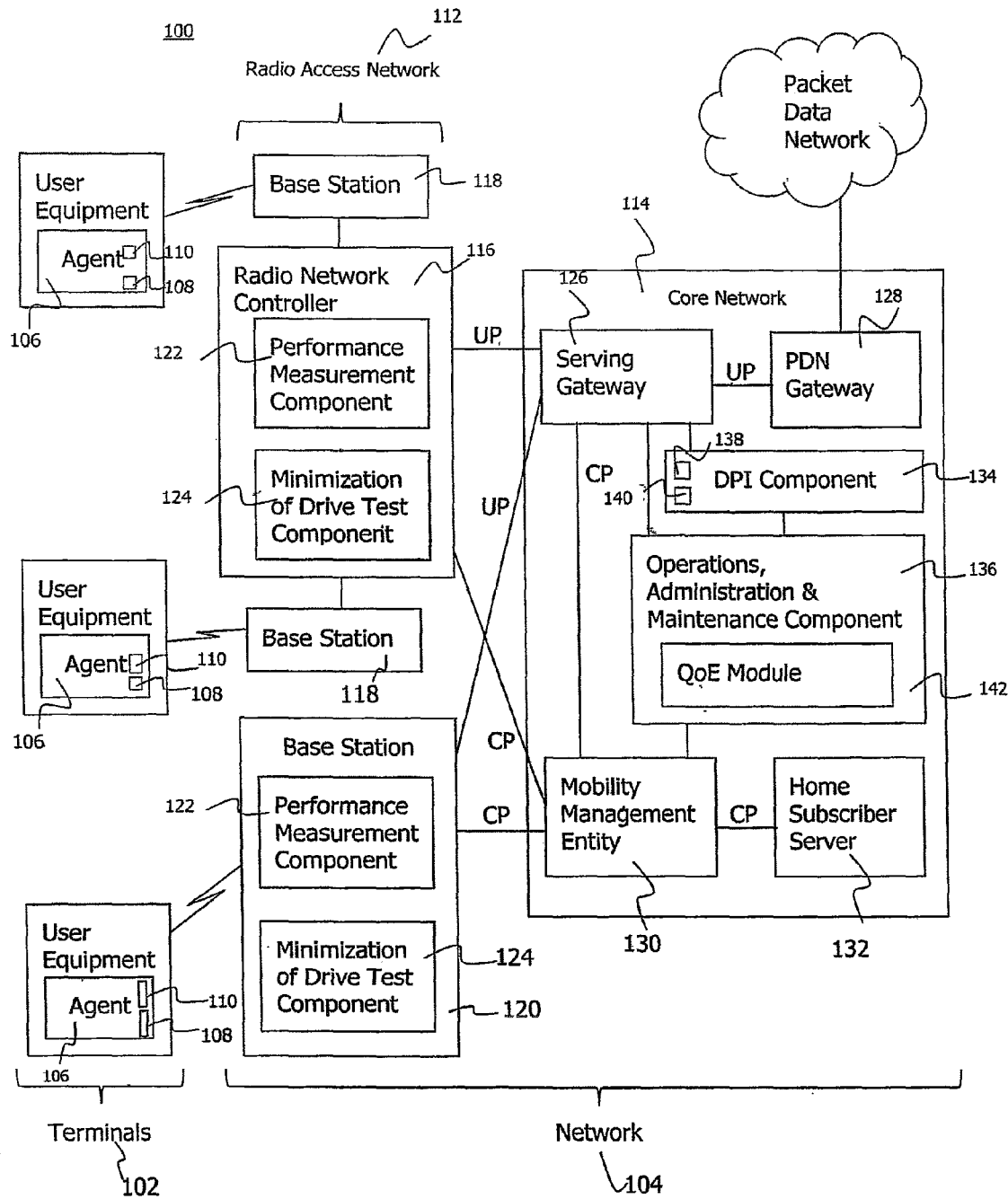

FIG. 1 schematically illustrates an embodiment of a communication network 100 as an exemplary system environment for implementing any one of the embodiments described herein below. The communication network 100 shown in FIG. 1 is a mobile communication network including a plurality of mobile terminals 102 wirelessly connected to an operator network 104 (also referred to as the network 104 for brevity). Each of the terminals 102 includes an agent 106 comprising an associating module 108 and a sending module 110. In one variant, the sending module 110 is included in the terminal 102 outside of the agent 106, which has access to the sending module 110.

The network 104 comprises a Radio Access Network (RAN) 112 and a Core Network (CN) 114. In a network 104 compatible with the Universal Mobile Telecommunication System (UMTS), the RAN 112 includes a Radio Network Controller (RNC) 116 wirelessly connected to a plurality of base stations 118 (also referred to as Node B). The RNC 116 is connected to the Core Network 114, e.g., by means of microwave link, copper wire or fiber optic. In a mobile communication network 100 according to Long Term Evolution (LTE), a base station 120 (also referred to as an Evolved Node B) is directly connected to the Core Network 114. In a transitional implementation of the network 104, as schematically illustrated in FIG. 1, the base stations 118 and 120 may coexist.

Each RNC 116 (or, alternatively, the base stations 118) compatible with UMTS and the base stations 120 compatible with LTE include at least one of a component 122 for Performance Management (PM) and a component 124 for Minimization of Drive Test (MDT). In an advanced variant, the MDT component 124 at the side of the network 104 is used in conjunction with a peer MDT component 125 (shown in FIG. 8) included in each of at least a subset of the terminals 102.

The Core Network 114 includes a serving gateway 126 and a Packet Data Network gateway 128 (PDN gateway) coupled to a packet-switched Public Data Network, such as the Internet. In a variant, a single gateway provides the functionality of the gateways 126 and 128. The Core Network 114 further includes a Mobility Management Entity (MME) 130 coupled to a Home Subscriber Server (HSS) 132. The serving gateway 126 and the PDN gateway 128 route User Plane (UP) data. The MME 130 and HSS 132 define a Control Plane (CP). Each of the UP and the CP is connected to the RAN 112.

The Core Network 114 further includes a Deep Packet Investigation (DPI) component 134 and a component 136 for Operations, Administration and Maintenance (DAM), each of which is coupled to the serving gateway 126 for accessing a data flow on the UP. In a variant, the DPI component 134 is implemented within the OAM component 136. The DPI component 134 is an example of a component configured to measure data traffic in the UP. While FIG. 1 illustrates an embodiment of the DPI component 134 arranged on a side branch of the UP data flow, the DPI component 134 is alternatively arranged to route UP data and to perform DPI.

The DPI component 134, or any other component in the network 104 configured for measuring data traffic, includes a receiving module 138 and an associating module 140. The DPI component 134 on the side of the network 104 and the agent 106 on the side of the terminal 102 can be considered as peer network components communicating by means of the sending module 110 and the receiving module 138, respectively.

The OAM component 136 optionally includes a module 142 configured for evaluating a Quality of Experience (QoE) function. The QoE function is evaluated based on results provided by the DPI component 134.

Figure 2:
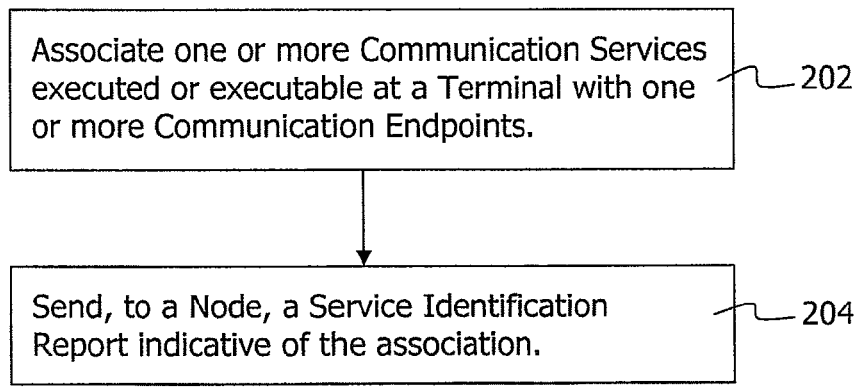
FIG. 2 shows a flowchart of a method embodiment that can be performed by the terminal shown in FIG. 1.
Figure 3:
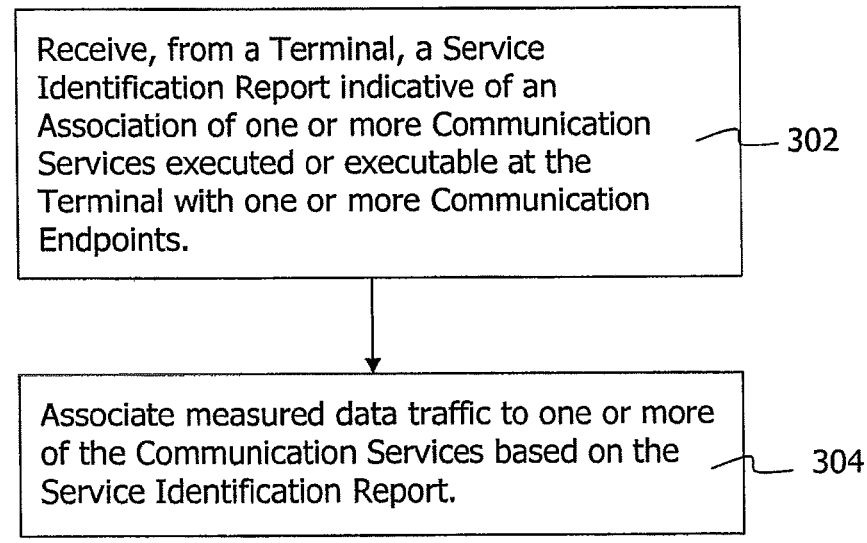
FIG. 3 shows a flowchart of a method embodiment that can be performed in the network shown in FIG. 1.

FIGS. 2 and 3 show flowcharts illustrating embodiments of methods 200 and 300, respectively, of identifying services for monitoring data traffic in a communication network. The communication network includes at least one terminal configured to receive and/or transmit data and a component configured to measure data traffic.

In one implementation, the flowcharts of FIGS. 2 and 3 illustrate methods for operating the agent 106 and the DPI component 134, respectively. The communication network may thus correspond to the communication network 100 described with reference to FIG. 1. The component configured to measure data traffic is implemented by the component 134 or any other component of the communication network that is different from the terminal, e.g., a dedicated node in the network 104.

The method 200 includes steps performed by the terminal, e.g., any of the terminals 102 shown in FIG. 1.

The method 200 includes a step 202 of associating one or more communication services executed or executable at the terminal with one or more communication endpoints. The communication endpoints are defined in accordance with a communication protocol used by the terminal. For example, the definition of the communication endpoint specifies the communication protocol, an address and a port number of a port at the address for the communication protocol used by the communication service.

The communication endpoints can be managed by an operating system of the terminal. In some implementations, the association is performed by means of an Application Programming Interface (API) provided by the operating system of the terminal, e.g., a socket API. The method 200 further includes a step 204 of sending a service identification report indicative of the association from the terminal to the component.

An embodiment of the method 300 of identifying services for monitoring data traffic in a communication network is shown in FIG. 3. The communication network includes a terminal configured to transceive data traffic and a component configured to measure data traffic. The steps of the method 300 are performed by the component, e.g., the DPI component 134 shown in FIG. 1.

The method 300 includes a step 302 of receiving, from the terminal, a service identification report indicative of an association of one or more communication services executed or executable at the terminal with one or more communication endpoints. A definition of the one or more communication endpoints may include physical or logical addresses used by the communication network for routing the data traffic to the terminal and for identifying a client process executed by the terminal. The method 300 further includes a step 304 of associating measured data traffic to one or more of the communication services based on the service identification report.

The associating module 108 and the sending module 110 are adapted to perform the steps 202 and 204, respectively. The receiving module 138 and the associating module 140 are adapted to perform the steps 302 and 304, respectively.

At least in some embodiments, the DPI component 134 is thus capable of identifying the service underlying the data traffic and measure service performance based on the association. While conventional DPI-based solutions often fail to identify even frequently used services, such as Skype, the present disclosure allows performance estimation based on the reported association, e.g., for encrypted services. In at least some embodiments, the identification based on the reported association at least partially relies on packet header fields, so that a dependency on payload data in identifying the service is avoided or reduced. At least for some data packets, the underlying service can be identified without decompressing, decrypting or deciphering data fields.

In some cases, it is not necessary to report all the detailed association information or each association event. In at least certain situations, it is sufficient to report (for the method 200) and receive (for the method 300) when an application or process starts sending or receiving data, and when it stops the user data communication. As an example illustrating a certain communication behavior, a Web browser opens new network sockets for fetching Web page elements that are residing on different servers, such as online advertisements, banners, pictures, etc. It is not uncommon that up to 50 separate sockets are used only for fetching a single Web page.

In a variant of the technique, association events are filtered, so that only the first established association (e.g., the first opened socket) and the last released association (e.g., the last closed socket) are reported for each process. The variant minimize the amount of information reported in the service identification reports or the number of service identification reports. Another variant, which is combinable with the previous one, uses a preset filtering time, so that a short period, during which the application or the process intermittently does not have any associations (e.g., any open sockets), is not reported as a termination of sending or receiving, until the period without associations exceeds the filtering time. This variant minimizes the reporting, e.g., for applications that first close one socket and then immediately or very quickly afterwards open another one.

In an advanced embodiment, the reported information indicative of the communication endpoints can be combined with further service indicators, e.g., indicators accessible without DPI. The further service indicators include one or more of traffic pattern, measured bitrates, inter-packet arrival times, etc.

Based on the association between observed data packet and service, the DPI component 134 provides a service-specific performance estimation for each identified service. Operators of the network 104 thus can handle a service mix taking into account service-specific network requirements. In one use case, a given network capacity is partitioned according to predefined requirements of the different services. Tailoring the network capacity to the different services can improve end user experience of the network performance even without increasing the given network capacity.

In another use case, which is combinable with above use case, the technique provides the operators with information as to which services are used via the network 104 and allows measuring the performance of individual services. If the performance is unsatisfactory, the technique provides the means for fast and efficient trouble-shooting to localize and solve the performance problem.

The technique is not limited to network performance measurements. In still another use case, which is combinable with above network optimization and/or above bottleneck localization, the technique is applied to customer-care or customer-support. For instance, the technique allows identifying why a monthly quota of a user is quickly consumed, so that the user can be informed of the underlying service potentially executed in a background mode transparent to the user. Alternatively or in addition, the DPI component 134 or any other node in the network 104 uses the technique to discover a process that is executed at the terminal 102 and uses the network 104 in a strange or excessive way, so that a network operator can inform the user of the terminal 102 and the user can decide to uninstall or reconfigure an application using this process. In particular, the technique allows identifying potential malware executed at the terminal.

The term component, as used herein, encompasses any spatial location in the network 104 and any functional entity of the network 104, including nodes within the network 104. While FIG. 1 illustrates the technique using the DPI component 134 as an exemplary component configured to measure data traffic, variants thereof implement the receiving module 138 and the associating module 140, alternatively or additionally, in any one of the Performance Management component 122, the Minimization of a Drive Test component 124 and the serving gateway 126. In further variants, the receiving module 138 and the associating module 140 are located at different components of the network 104.

Figure 4:
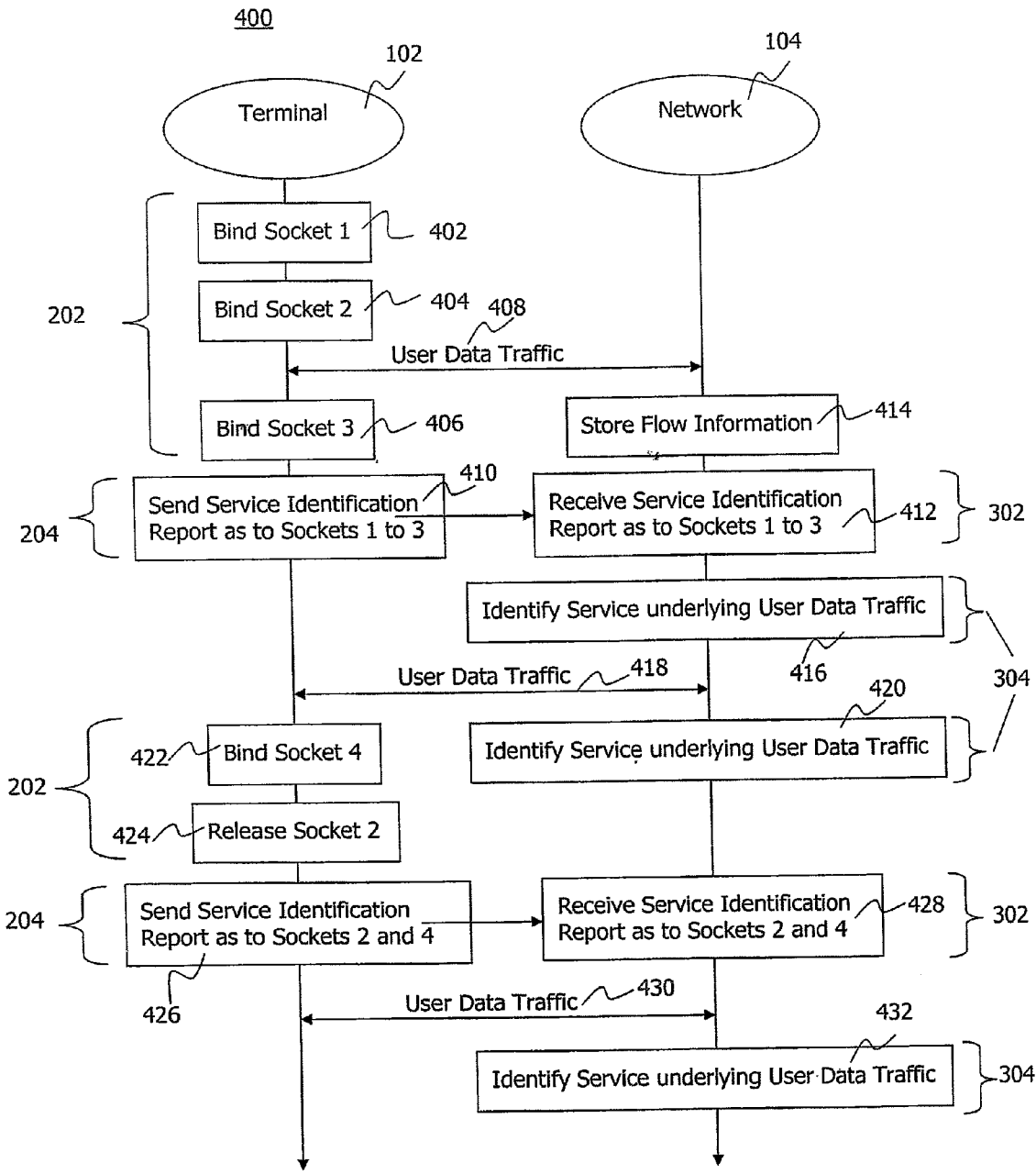
FIG. 4 schematically illustrates steps of the method embodiments of FIGS. 2 and 3 performed by the terminal and the network, respectively, in conjunction with an associated communication between the terminal and the network.

FIG. 4 schematically illustrates a sequence of steps and associated communication between the terminal 102 and the network 104. In the embodiments of the methods 200 and 300 collectively described with reference to FIG. 4, the communication end points are represented by network sockets and the association includes one or more socket bindings. The step 202 of the embodiment of the method 200 (which is shown in FIG. 4 for the terminal 102) is performed by a binding monitor included in the agent 106. The binding monitor tracks socket bindings performed by any one of the processes executed in the terminal 102.

In the implementation shown in FIG. 4, the communication endpoints are represented by network sockets 1 to 4 provided by the operating system of the terminal 102. The network sockets of the terminal 102 are service-dedicated destination addresses based on which the operating system directs incoming user data traffic 408 to the associated process. The socket is also used in dispatched data packets as a source address for identifying the associated process from which the data packets originate.

The bindings of sockets 1 to 4 are logged for a predetermined time and represent the association 202. Socket bindings are generally performed for a variety of reasons including all kind of Inter-Process Communication (IPC), such as socket bindings towards the internal file system of the terminal 102. Only the socket bindings towards an external network interface are logged in the association step 202. For example, the sockets 1 to 3 are associated to processes $P_1$ to $P_3$ in the steps 402, 404 and 406, respectively. In the example shown in FIG. 4, as soon as the process $P_2$ is associated with the network socket 2, the process $P_2$ induces user data communication 408 towards the network 104.

The associations logged over the predetermined time are sent to the network 104 by means of the service identification report in a step 410, as an instance of the step 204 of the method 200.

The network 104 reads socket information from the user data traffic 408. The socket information defines one or more data flows included in the user data traffic 408. The network 104 receives the service identification report as to the sockets 1 to 3 in a step 412, which is an instance of the step 302 of the method 300. In this example, the step 412 occurs after the exchange of the user data traffic 408 with the terminal 102. The network has stored, in a previous step 414, information as to one or more data flows. Based on the stored data flow information and the received service identification report, the network 104 identifies the one or more processes that receive or transmit, at the terminal 102, the data flow observed at the network 104. The identified one or more processes define a service underlying the user data traffic 408, so that the service is identified in a step 416 as an instance of the step 304 of the method 300.

As long as the association information available at the network 104 corresponds to the association between sockets and processes at the terminal 102, the network 104 readily identifies the one or more services underlying any further user data traffic 418 in a step 420. The service identification 420 is triggered by the preceding user data traffic 418. In case the socket information extracted from the user data traffic 418 cannot be associated with any one of the processes included in the service identification report, the socket information is stored as part of the data flow information for service identification based on a later received service identification report.

The association at the terminal 102 may change after sending the service identification report in the step 410. Such changes of the association at the side of the terminal 102 include a further socket binding, as shown in a step 422, or a release of a previously bound socket, as shown in step 424. As soon as the predetermined time for collecting such binding and releasing events has elapsed since the dispatch of the last service identification report, a further service identification report is sent in a step 426 to the network 104.

The network 104 receives the further service identification report and updates its association information accordingly in a step 428. As soon as further user data traffic 430 is exchanged between the terminal 102 and the network 104, the network 104 identifies the service underlying the user data traffic 430 in a step 432 based on the data flow information extracted from the user data traffic 430 and the updated association information.

Figure 5:
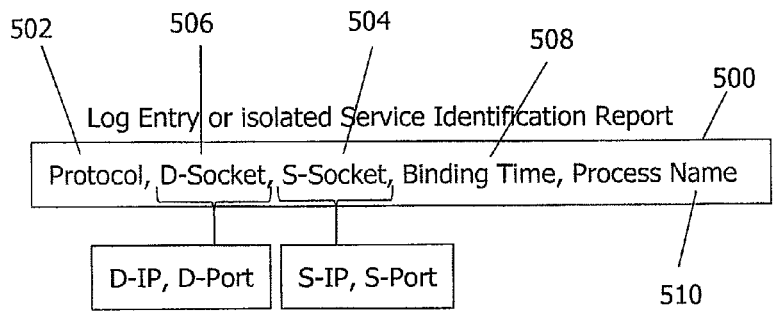
FIG. 5 schematically illustrates an embodiment of traffic flow information.

FIG. 5 schematically illustrates association information 500 that is logged by the agent 106. In the context of the embodiments discussed with reference to FIG. 4, the association information 500 represents socket binding information for each of the socket binding events 402, 404, 406 and 422. In a variant of the implementation of the method 200 shown in FIG. 4, the socket binding is immediately reported, in the step 204, to the network 104 using an isolated service identification report including one record of the socket binding information.

When an application in the terminal 102 needs to communicate with another entity, for example another Skype client, the application first establishes a communication channel to the other entity. The communication channel is typically established according to the Transmission Control Protocol (TCP) or the User Datagram Protocol (UDP), and one or more specific ports.

The socket binding information 500 indicates a protocol 502 used by the process that requested the socket binding, the local socket bound to the process at the terminal 102, a remote socket indicating a destination of the data flow sent from the process or a source of the data flow received at the local socket by the process, a binding time 508 based on a local clock of the terminal 102 and a name 510 of the process executed in the terminal 102.

From the perspective of the network 104 receiving the service identification report and analyzing the user data traffic, the data flow information extracted from the data packets of the user data traffic includes pieces of information corresponding to the entries in the socket binding information 500. In the case of user data traffic sent from the terminal 102, the local socket corresponds to a source socket 504 and the remote socket corresponds to a destination socket 506. In the case of user data traffic received at the terminal 102, the local socket corresponds to the destination socket 506 and the remote socket corresponds to the source socket 504. The agent 106 provides a single service identification report for a bidirectional data flow. The component 134 receiving the service identification report is adapted to interchange the socket pair depending on the direction of the observed data flow. The service identification report is thus more compact and free of redundant information.

More specifically, the source socket 504 includes a source Internet Protocol (IP) address and a source port. In the case of a data flow received at the terminal 102, the destination socket 506 is a communication endpoint at the terminal 102. Similarly, the destination socket 506 includes a destination IP address and a destination port. In the case of a data flow received at the terminal 102, the process listens on the destination port.

In an advanced variant, the binding monitor logs binding events related to both the opening (i.e., the binding) of a socket, such as the events 402, 404, 406, 422, and the closing (i.e., the release) of a socket, such as the event 424. The socket binding information 500 includes a further entry "Event" indicative of the type of the binding event being either "binding" or "unbinding".

The log thus stores a 5-tuple including entries for protocol, destination IP address, destination port, source IP address, source port as identification of the data flow, and further record entries indicating the binding time 508, the process name 510 and, optionally, the event type:
  Protocol, D-IP, S-IP, S-Port, D-Port, Binding Time, Process Name, Event.

In a reduced variant, the logged socket binding information, or the socket binding information included in the service identification report, is restricted to pieces of information related to the side of the terminal 102. The socket binding information includes, e.g., one or more of:
  Protocol, S-IP, S-Port, Binding Time, Process Name, Event.

Figure 6:
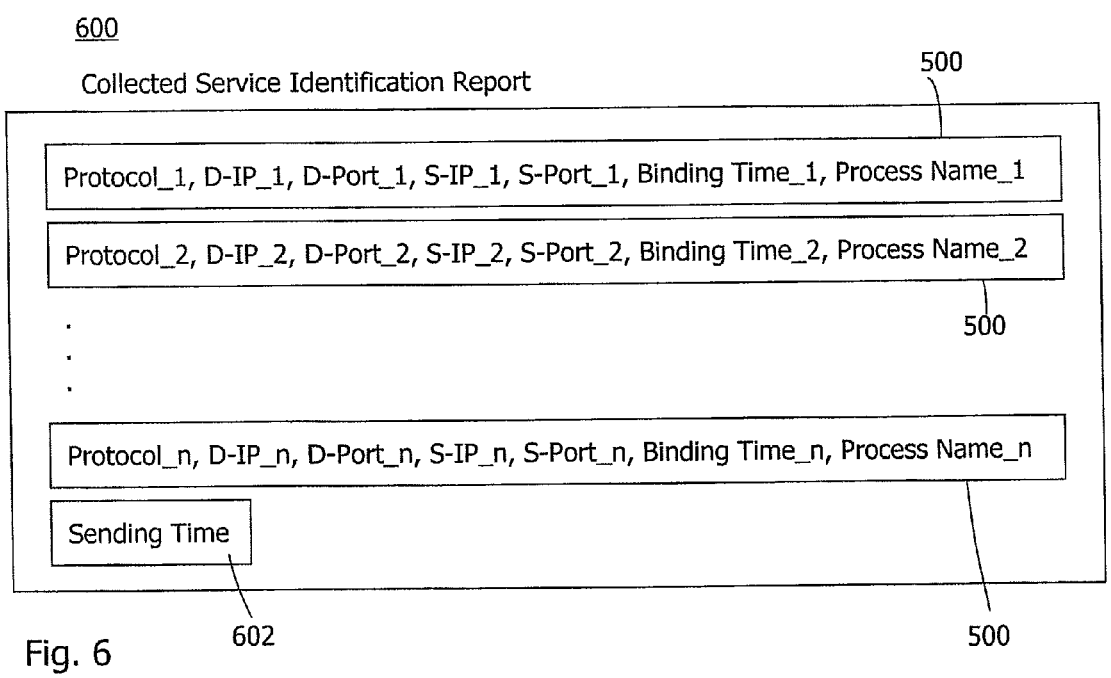
FIG. 6 schematically illustrates an embodiment of a service identification report based on the traffic flow information of FIG. 5 that is included in the communication of FIG. 4.

FIG. 6 schematically illustrates a service identification report 600 that is sent in the step 204 by the terminal 102 or received at the network 104 in the step 302. The service identification report 600 includes a plurality of records of the association information 500, e.g., for each of the binding events 402 to 406. For example, each of the records included in the service identification report may include the socket binding information 500 as described with reference to FIG. 5 above, the advanced variant thereof, or the reduced variant thereof. Furthermore, cross-combinations of different variants of the association information 500 can be reported. E.g., service uniquely identified by S-IP and S-Port is reported using the reduced record in combination with an advanced record to differentiate services using the same S-Port at the terminal 102. The size of the service identification report 600 is thus reduced without loss in its capability of identifying services.

In addition, the service identification report 600 includes a sending time (ST) 602 indicating when this service identification report 600 was sent. The sending time 602 is derived from the same local clock of the terminal 102 that provides the binding time 508, e.g., for each of the binding events 402 to 406.

At the side of the network 104, the component (e.g., the DPI component 134 or a dedicated node of the network 104) receiving the service identification report 600 determines an arrival time using a clock at the component receiving the service identification report 600. The component computes a time difference between the arrival time of the service identification report 600 and the reported sending time 602. A clock difference between the terminal 102 and the component at the network 104 is estimated based on the computed time difference. In an advanced variant, the time difference is used to account for a time delay due to the transmission. The computed time difference thus includes both potential deviations in the clocks and a transmission delay.

The component receiving the service identification report 600 further adjusts the binding times 508 included in each record of the association information 500 based on the estimated clock difference to represent a corrected time in terms of the clock located at the node of the network 104.

In each of the steps 414 (with postponed service identification) as well as 420 and 432 (with direct service identification), the component at the network 104 responsible for measuring the user data traffic, such as the DPI component 134, extracts from the user data traffic, e.g., from header fields of data packets, information that corresponds to the entries of the 5-tuple as extracted data flow identification. By comparison with the reported data flow identification (e.g., the reported or stored 5-tuple) and the corrected binding times, the component responsible for measuring user data traffic at the network 104 associates the measured data traffic to the underlying process out of the service identification report according to the step 304, as discussed above for the instances 416, 420 and 432.

Although the process name 510 is not as descriptive as the actual application name of the application performed at the terminal 102, the process name 510 allows identifying or at least characterizing the application using the socket. The network 104 thus has knowledge about which process is associated to which data flow. When a service is characterized by one process or a process combination, the network 104 has identified which services are underlying the measured data traffic. The component measuring the user data traffic uses this knowledge to differentiate its performance measurements for each of the identified services. For example, user data statistics are established for each of the identified services.

While above exemplary system environment illustrates the technique for the case of a service identification report 600 sent from the terminal 102 to the DPI component 134, the present disclosure can be implemented by combining any service performance monitoring system with the exchange of service identification reports 600. For example, the service identification reports 600 can be provided to the network 104, which combines the association information 500 with one or more of MDT reports, call trace analysis data, other performance data, service packet reports (also referred to as packet digest reports) from the terminal 102 about arrival and/or departure of data packets, network DPI packet digest information, and Service-Key Performance Indicators (S-KPIs) obtained from Service DPI performed in the network 104.

The technique thus can be practiced by various service performance monitoring systems not necessarily correlating all of above sources of information. For example, in a minimalistic realization, only the association information 500 provided by service identification reports 600 and MDT reports are used. In a more advanced realization, the service identification reports 600 and the MDT reports are complemented with DPI information (e.g., derived at the network 104) and service packet reports (e.g., provided by the terminal 102). Latter advanced system may also be implemented without MDT reports.

For correlating the service identification reports 600 with dedicated measurements provided by different components of the network 104, the service identification reports 600 can also be broadcasted from the terminal 102 to each of the components responsible at the network 104 for the dedicated measurement.

The service identification reports 600 provide, to the network 104, information on the level of data flows. More detailed information on the level of data packets is useful for packet pattern correlation, because service specific DPI will be limited to a relatively small set of Internet services. Many services use proprietary protocols and/or encrypted data packets, each of which limits or even excludes the possibility for investigating beyond standard protocol headers. The packet pattern correlation allows, even for these cases, to precisely estimate the QoE function, if information about departure and delivery of IP packets between network 104 and the terminal 102 are available. Such packet-level information is provided by service packet reports (also referred to as packet digest reports).

Figure 7:
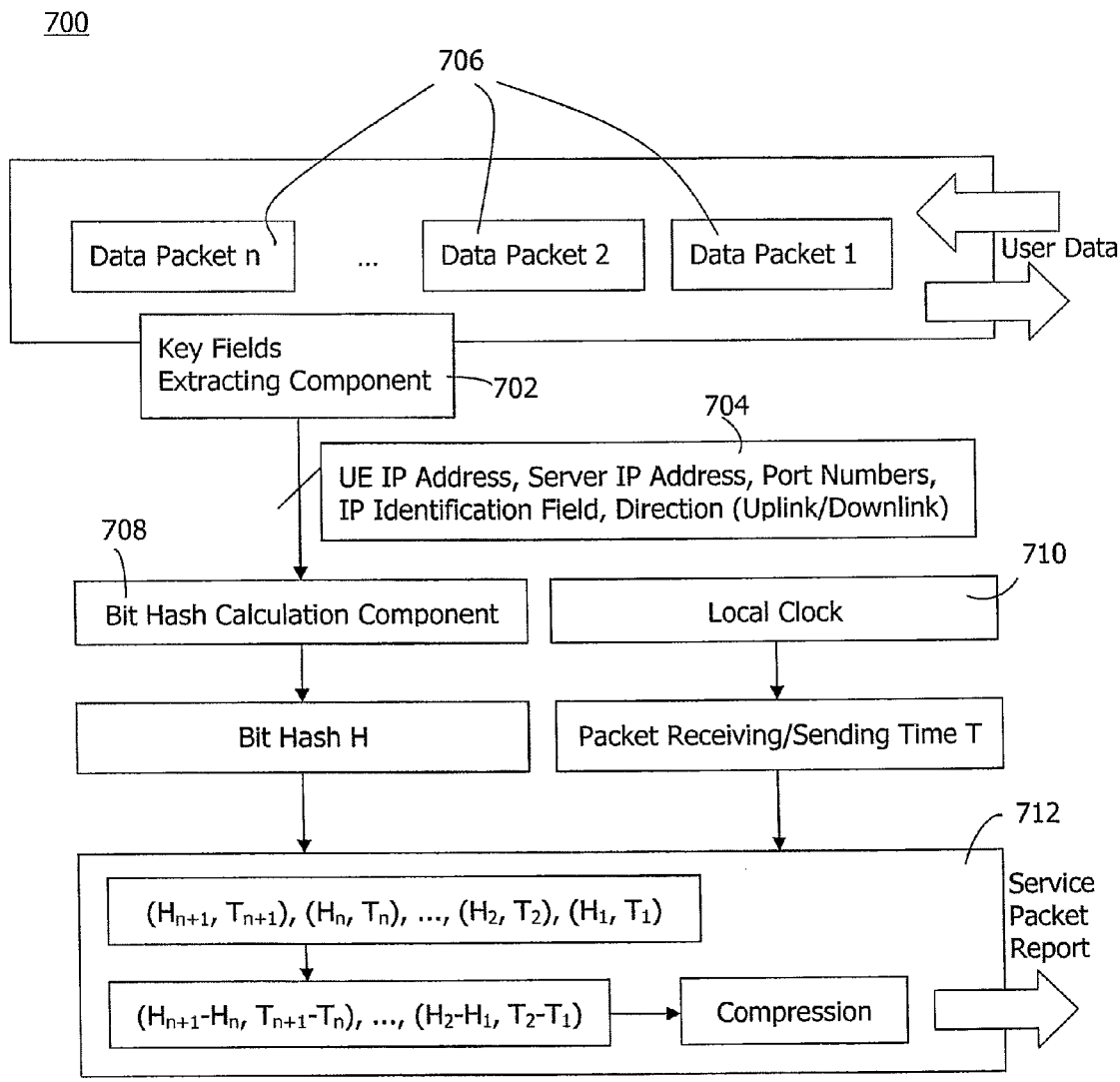
FIG. 7 schematically illustrates an embodiment of generating a service packet report.

FIG. 7 schematically illustrates a module 700 adapted to provide service packet reports to a component in the network 104. The module 700 can be implemented in the agent 106 or as a separate module in the terminal 102.

The module 700 includes a key field extracting component 702 adapted to extract key fields 704 from user data packets 706 received or transmitted at the terminal 102. In an embodiment of the module 700, the key fields 704 include IP addresses, port numbers and the IP identification field. For example, the extracted key fields include pieces of information that correspond to entries reported as part of the association information 500 to identify the data flow. In a variant of the embodiment of the module 700, the key fields 704 include further protocol fields of higher layers.

The module 700 further includes a bit hash calculation component 708 adapted to calculate a bit hash H for each of the data packets 706. A local clock 710 of the terminal 102 provides an exact timestamp T indicative of the receiving or sending time of each of the data packets 706. The local clock 710 can be identical to the local clock used to provide the binding times and sending times described above for the service identification reports.

A combining component 712 is adapted to combine the bit hash H and the timestamp T for each data packet 706 in a series of data packets into the service packet report. The service packet report is sent to a component in the network 104, e.g., to the same component receiving the service identification report. At the side of the network 104, the association reported by means of the service identification reports 600 can be combined with the hashed key fields to identify the underlying service. At the side of the terminal 102, the sending module 110 can also perform the sending of the service packet report.

The sequence of pairs (H, T) of bit hash H and timestamp T can be efficiently compressed. For example, each bit sequence represented by H and T can be compressed. Alternatively or in combination, the entire sequence of pairs (H, T) is bit-packed for even better compression.

In a variant of the collecting component 712 (which is optionally compatible with the compression), the differences $T_{n+1}-T_n$ and/or the differences $H_{n+1}-H_n$ are stored and included in the service packet report. When there are just few bit differences in consecutive headers of the data packets 706, e.g., increments by one in the IP identification field, less bits are required to represent these differences. To limit the total size of the service packet report, the number of data packets 706 represented by the service packet report is optionally limited, e.g., to 1000 data packets 706 per service.

A corresponding algorithm including a key field extracting component 702 and a bit hash calculation component 708 is also provided in the component (e.g., the component 134) receiving the service packet report at the network 104. The component determines, for each of the data packets observed at the network 104, a bit hash H' and a time stamp T'. The component can thus identify observed data packets based on corresponding service packet reports by comparing the determined bit hash H' and the reported bit hash H. The process name or the service is optionally identified by means of the service identification report 600.

By extracting the reported timestamps T from the service packet report and identifying data packets by means of the reported bit hash H, the component at the network 104 correlates the times T' of packet arrival with the reported timestamps T on a packet level for each service separately. The correction based on the time difference is optionally applied to the reported timestamp T before the correlation.

In the course of the correlation, packet losses are detected. For example, the absence of a data packet at the network 104 at a time corresponding to a reported timestamp T is used as an indicator for the loss of the data packet.

At the side of the terminal 102, the module 700 is triggered via the binding monitor, which detects when the user invokes a new service. The module 700 is adapted to record the timestamp T and to calculate the associated bit hash H separately for each data flow associated with the service. For example, separate instances of the module 700 can be implemented for each service.

At the side of the network 104, statistics on delay and jitter are derived based on the correlation of a plurality of data packets belonging to the same service. The statistics on delay, jitter and/or packet loss are service-specific. The statistics on delay, jitter and/or packet loss are input into the QoE estimation function.

The computation of the bit hashes H and H' is suitable for many different services. In a basic implementation, the service packet reports are provided by the module 700 using the same algorithm separately for each service. The same module 700 is consecutively applied to a plurality of different services, or one of equally structured modules 700 are implemented for each service.

In an advanced embodiment, the service packet reports are service-specific. The module 700 generating the service packet reports at the terminal 102 and/or the corresponding analysis at the network 104 based on the service packet reports depend on the associated service, e.g., the service association information 500 included in the service identification reports 600. In one implementation of the advanced embodiment, the service packet reports are tailored to the QoS requirements of each of the services, processes or applications for the IP network. For example, service packet reports for a real-time service (e.g., Skype) provide additional packet information based on which the component at the network 104 derives deeper jitter analysis or additional statistics on the temporal correlation of errors in the data flow, e.g., statistics about so-called "errored seconds".

The analysis of such advanced service packet reports is triggered (e.g., at the component receiving the advanced service reports) in the network 104 by the service identification report 600 indicating a service that is subject to the advanced analysis. In one variant, a list of services is shared among the terminals 102 and the network 104 and used to determine whether a given service is subject to the advanced analysis. In another variant, the service identification report 600 includes in the association information 500 of the corresponding service a flag triggering the advanced analysis.

The advanced service packet reports are provided by the agent 106 as an add-on piece of information in the service packet reports 600. The basic information provided by the basic component 702 and 708 is not replaced, which ensures backward compatibility with network components not supporting the service-specific service packet reports.

The service packet reports thus provide information at the packet level for deriving statistics on jitter, latency and packet loss without deploying active testing solutions, thus avoiding several disadvantages of the prior art. The conventional acting solutions require that the terminal 102 and the network 104 exchange specific packet trains with specific inter-arrival patterns. Typically, such packet trains use packet trains at low rates to minimize power consumption and to induce as little network load as possible. However, such active testing patterns are significantly different from the actual application-generated packet pattern. Since radio networks deploy specific scheduling algorithms that depend on many factors, including packet rates, the packet level performance of conventional active test traffic can be very different from the packet-level performance of the actual application.

The service packet reports described above do not introduce additional load of data traffic and use the actual application traffic as a test pattern in a passive way. Furthermore, battery consumption is not significantly impacted. The technique thus measures the real IP layer network behavior.

At least some embodiments minimize intra-network traffic by locating functionality for the analysis of the service packet reports and the derivation of packet-level statistics based on the service packet reports in the component responsible for measuring the data traffic, e.g., in the DPI component 134.

Figure 8:
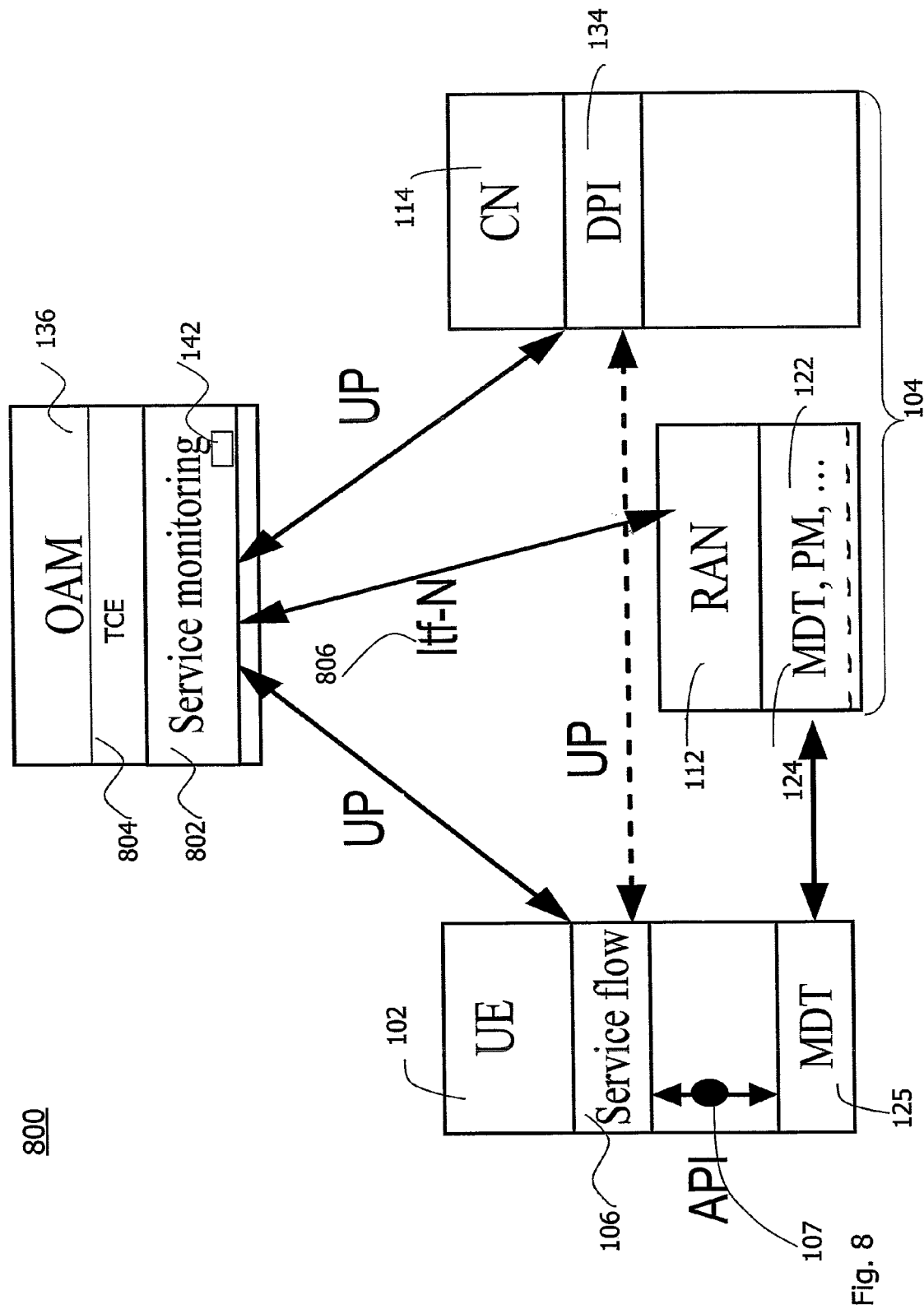
FIG. 8 schematically illustrates an embodiment of a high-level architecture of the system environment of FIG. 1 configured for measurements in a radio access network.

FIG. 8 schematically illustrates a high-level architecture view of a service monitoring protocol 800. Logical links among the terminal 102 and the components (including network nodes) of the network 104 shown in FIG. 1 are indicated in FIG. 8 independent of physical links used to implement the logical links. The architecture shown in FIG. 8 is consistent with the LTE standard. The technique can also be implemented in a mobile communication network 100 compatible with the UMTS standard.

The network components in the RAN 112 optionally include one or more of a trace component, the PM component 122, the MDT component 124 and other components adapted to collect performance data. The performance data provided by these components is combinable with the service identification reports 600 described above in the exemplary context of the DPI component 134. The agent 106 providing the service identification reports 600 associates local processes to data flows, the definition of which includes communication endpoints of the data flows.

While the MDT component 124 measures the downlink of user data traffic at the side of the RAN 112, a MDT component 125 measures the uplink at the side of the terminal 102. The MDT component 125 and the agent 106 communicate by means of Application Programming Interfaces (API) 107 provided by the operating system of the terminal 102.

The service identification reporting within the terminal 102, the service reporting by the agent 106 from the terminal 102 to the network 104, and the corresponding analysis in the network 104 (e.g., at the DPI component 134) are independent of the Radio Access Technology (RAT). Typically, the analysis is located in the core network 114.

The OAM component 136 includes a service monitoring component 802. The service monitoring component 802 controls and configures the measuring components 106, 122, 124, 125 and 134 (to the extent present) of the network 104. The service monitoring component 802 further collects the reported information and analyses the reported data.

The agent 106 in the terminal 102 is configured from the OAM component 136, for example using the service monitoring component 802. The configuration is signaled in the Control Plane (CP), e.g., using MDT trace. Alternatively, the agent 106 is configured via User Plane (UP) protocols, e.g., TCP/IP. For example, the agent 102 can be configured from the DPI component 134 in the network 104. The configuration is signaled from the DPI component 134 in the UP.

A configuration for the terminal 102 or the network 104 specifies at least one of a type of report, a periodicity of the reporting, an IP address of a data collector to which reports are to be sent, etc. For example, the report type specifies whether only service identification reports 600 or, additionally, service packet reports (also referred to as packet digest reports) are to be provided. The type of report can further specify different service packet reports for different services.

The reports of the agent 106 are sent in the UP to the IP address specified in the configuration and/or in the CP using a Radio Resource Control (RRC) protocol. The data collector can be either the OAM component 136 (more specifically, the service monitoring component 802 forwarding the data to the TCE 804, or directly the TCE 804), the DPI component 134 in the core network 114 or a separate data collector node.

The UP reporting is typically combined with the configuration also being UP-based. Similarly, the CP reporting can be used when the configuration is also CP-based. In a generic case, any combination of UP and CP is possible (e.g., sending the configuration via CP, and reporting via UP). In what follows, an implementation using CP signaling is described with reference to FIGS. 9 and 10, and an implementation using UP signaling is described with reference to FIGS. 11 and 12.

Figure 9:
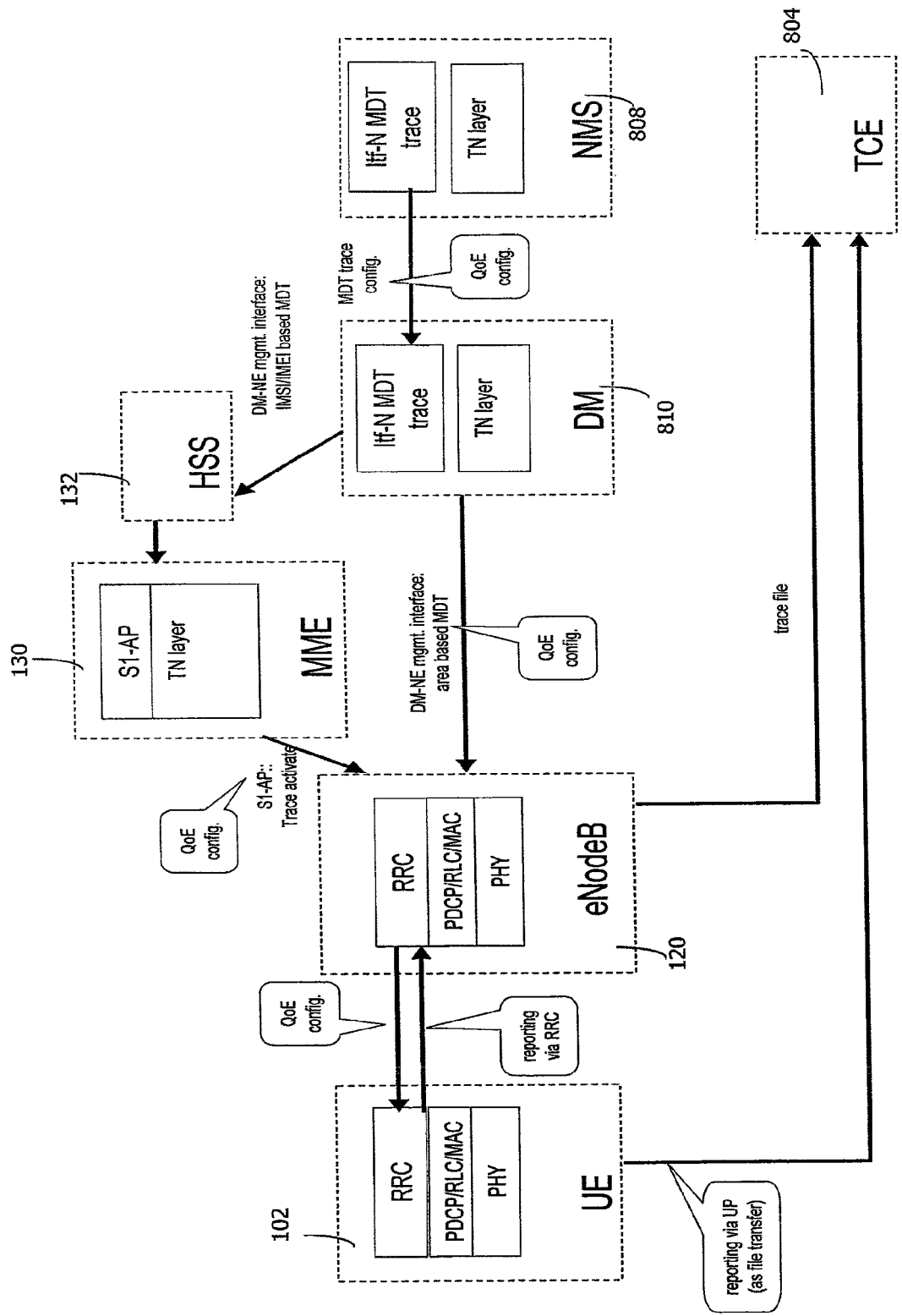
FIG. 9 schematically illustrates an embodiment of a control plane signaling.

A signaling architecture for conveying, in the CP, the configuration to the terminal 102 and the service identification reports 600 from the terminal 102 is shown in FIG. 9. The configuration is carried inside the regular MDT trace propagation signaling, as specified in 3GPP TS 32.422 (which provides details of MDT trace signaling). Propagating the configuration includes the following steps.

A Network Management System (NMS) 808 initiates an MDT trace job over the Itf-N interface 806 towards the Domain Manager (DM) 810 and includes the service flow reporting configuration as part of the trace job attributes. The OAM component 136 can be implemented as a functionality within the NMS 808.

The service flow reporting functionality is added into immediate MDT trace job, added into a logged MDT trace job, or a new MDT job type is created specifically for this purpose. The immediate MDT trace is related to connected mode reporting (i.e., real-time reporting). The logged MDT trace is related to idle mode logging (i.e., non real-time), wherein the terminal 102 in idle mode collects and logs measurements, which are reported to the network 104 in a batch when the terminal 102 enters connected mode the next time. Using the new MDT job type is similar to using the logged MDT trace in that the terminal 102 does not need to report continuously but logs the results locally and sends them in a batch. Using the new MDT job type differs from the logged MDT trace in that the logging is also performed in connected mode (i.e., in both connected and idle mode).

The DM 810 propagates the MDT trace job requests towards the Core Network (CN) 114 (e.g., HSS 132 or MME 130) in case of a trace based on an International Mobile Subscriber Identity (IMSI) or International Mobile Station Equipment Identity (IMEI). Alternatively, the DM 810 propagates the request toward the RAN 112 (e.g., the eNodeBs 120) in case of an area-based trace (which is also called management-based trace).

The RAN 112 (e.g., the eNodeB 120) receives the trace request either from the DM 810 or from the CN 114 (e.g., the MME 130). The trace request is routed directly to the RAN 112 in case of an area-based trace when all terminals 102 in a set of cells need to be traced. The trace request is routed via the CN 114 in case a particular terminal 102 with given IMSI/IMEI is to be traced. Means for configuration signaling are also described, in the context of conventional active test traffic measurements, in document WO 2012/110054.

The RAN 112 (e.g., the eNodeB 120) initiates the reporting towards the terminal 102 by sending the service flow reporting configuration to the terminal 102 via RRC signaling. Optionally, the RRC protocol is extended with procedures and message information elements to convey the configuration. The configuration is sent as transparent information via the eNodeB 120. The eNodeB 120 does not need to interpret the service flow reporting configuration. The service flow reporting configuration is optionally sent as a configuration file (e.g., an XML file) to the terminal 102. The RAN 112 (e.g., the eNodeB 120) also configures ("regular") MDT measurements that have been requested in the MDT trace job.

The terminal 102 collects the service flow reports, i.e., the service identification reports and/or the service packet reports. Depending on whether the immediate MDT or logged mode MDT is used, the terminal 102 (e.g., the agent 106) either reports continuously to the network 104, or logs the reports locally and sends the logged information in a batch from time to time, e.g., according to the reporting periodicity.

In the entirely CP-based implementation, the reporting is also done in the CP, i.e., conveyed via RRC signaling. In a combined CP-UP-based implementation, the reports are sent in the UP, e.g., as described below in the context of the entirely UP-based implementation.

When reported over RRC, the eNodeB 120 fetches the reported information from the RRC message, puts it into a trace record and sends it to the Trace Collection Entity (TCE) 804. The CP-based reporting can be similar to the case of conventional MDT measurement data.

A format used for service flow reporting from the terminal 102 includes a predefined file format and one Information Element (IE) defined in the RRC message to convey the file. By way of example, the file is included in the IE as a byte string or the file is conveyed in the form of individual IEs, one for each record of the service flow information specified in the RRC message. The eNodeB 120 handles the service flow report as transparent information.

Figure 10B:
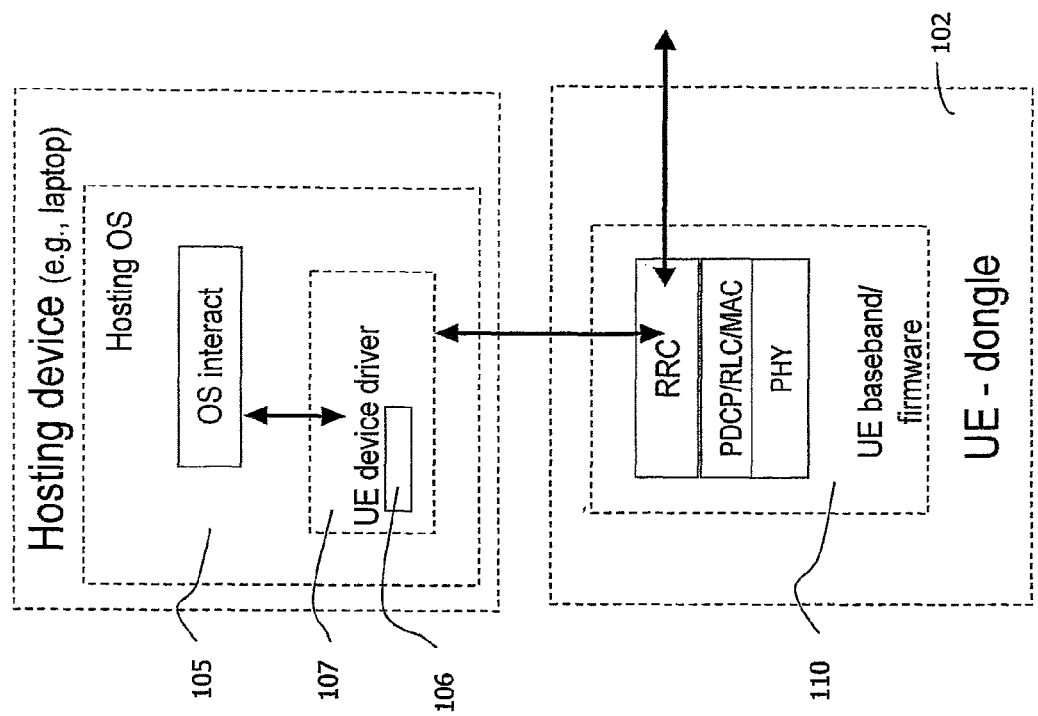
FIGS. 10A and 10B schematically illustrate an embodiment of architectures of the terminal shown in FIG. 1 adapted for control plane signaling.
Figure 10A:
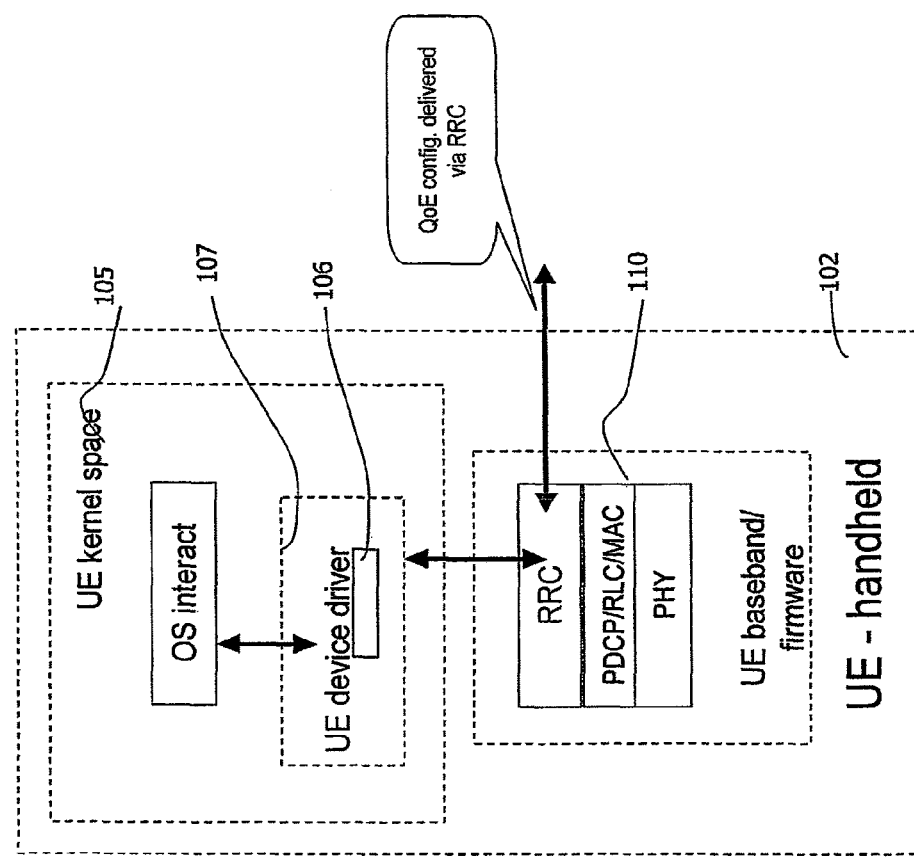

An exemplary architecture of the service flow reporting mechanism inside the terminal 102 for the CP implementation is shown in FIGS. 10A and 10B. FIG. 10A shows the case of the terminal 102 being realized as a handheld device. The case of the terminal 102 being a dongle device connected to some hosting system (e.g., a laptop) is illustrated in FIG. 10B.

The agent 106 (i.e., the service flow reporting functionality) is implemented in a device driver module 107 in the terminal 102, which connects to the lower layer protocols (e.g., RRC) in the baseband of the terminal 102 for implementing the sending module 110. The agent 106 is also imbedded into the Operating System (OS) 105 of the terminal 102. The device driver 107 receives the flow reporting configuration from the RRC layer of the terminal baseband 110, interacts with the OS 105 to obtain the required service flow information and sends the service flow reports via the RRC layer of the terminal baseband 110.

Figure 11:
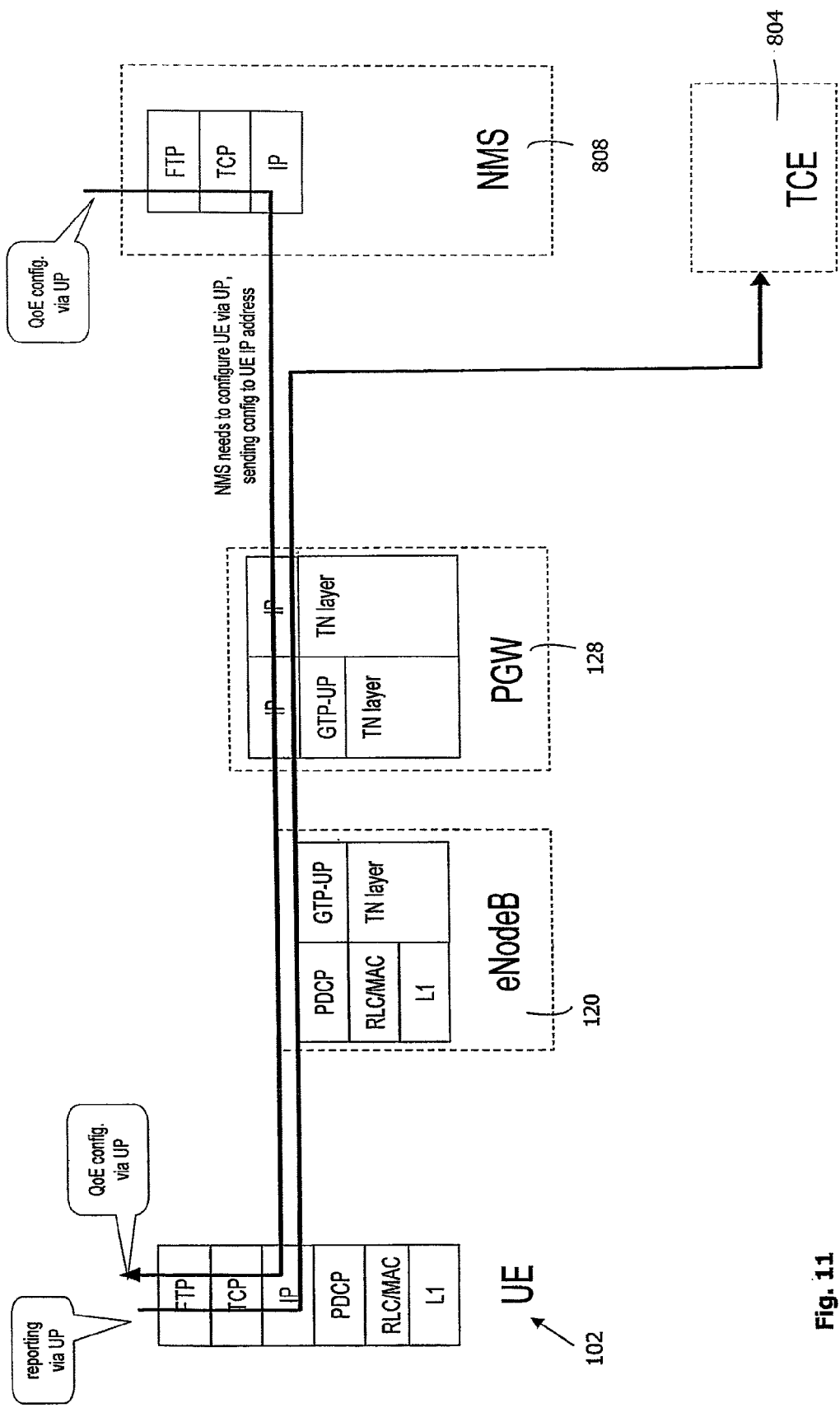
FIG. 11 schematically illustrates an embodiment of a user plane signaling.

A signaling architecture in case of the UP implementation is shown in FIGS. 11 and 12. A NMS 808 sends the service flow reporting configuration to a specific terminal 102 via UP protocols, e.g., using a File Transfer Protocol (FTP) over TCP/IP. The NMS 808 addresses specific terminals 102, one by one, using the local IP address of the terminal 102. The configuration is sent transparently via the network 104 using the UP protocols, as is shown in FIG. 11.

The terminal 102 receives the configuration, collects the service flow reports, e.g., in a file format, and sends the file back to the NMS 808 (e.g., to the data collection server, given in the configuration) via the UP, e.g., using same file transfer mechanism used for the configuration data.

In the UP implementation, the NMS 808 does not have the possibility of directly connecting the service flow reporting configuration with an MDT trace job configuration, which connection ensures in the CP implementation that the same set of terminals 102 reporting service flow information also report MDT measurements (unless IMSI/IMEI-specific MDT measurements are requested).

Figure 12B:
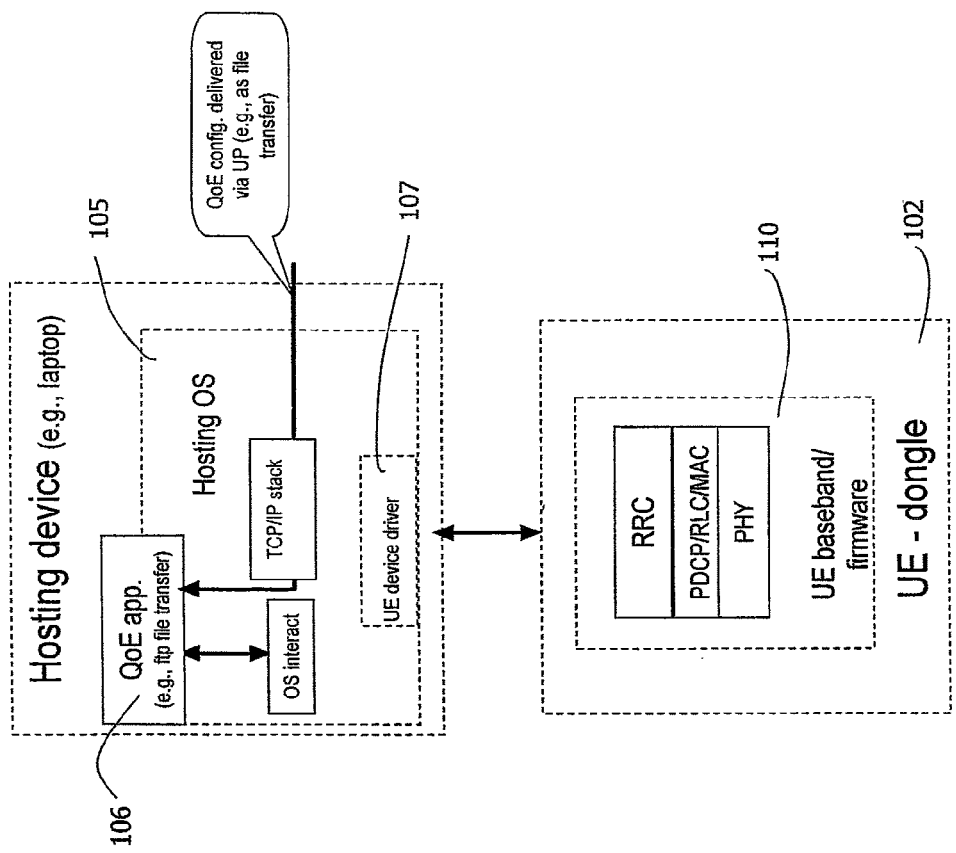
FIGS. 12A and 12B schematically illustrate an embodiment of architectures of the terminal shown in FIG. 1 adapted for control plane signaling.
Figure 12A:
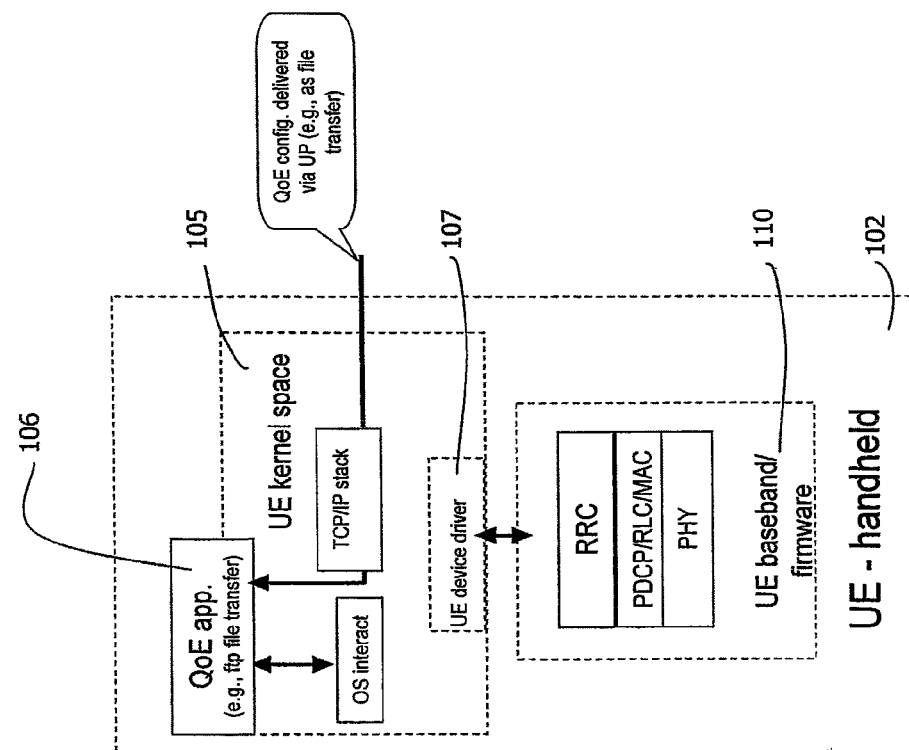
Figure 13:
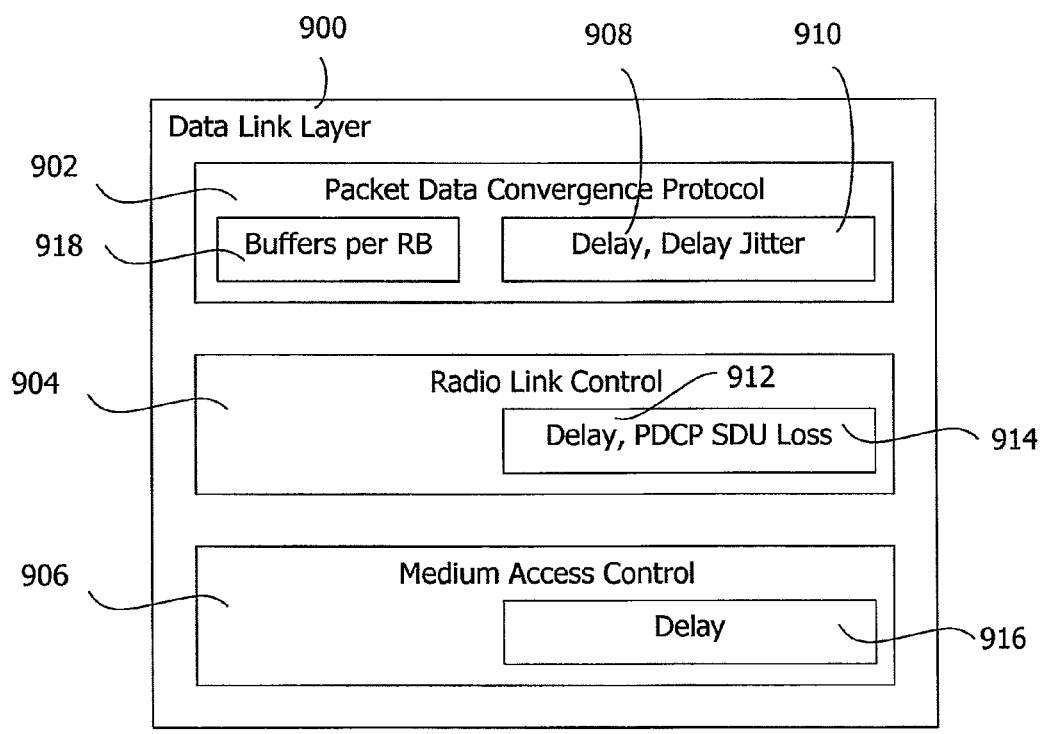
FIG. 13 schematically illustrates an embodiment of measurements on a Data Link Layer that can be implemented in the terminal and the radio access network of FIG. 8.

A possible architecture for the agent 106 (i.e., the service flow reporting mechanism) at the terminal 102 in the context of the UP implementation is shown in FIGS. 12A and 12B. In the UP implementation, the flow reporting functionality of the agent 106 is implemented in an application layer process, which "sits" on top of the OS layer of the terminal 102 (or partially imbedded in the OS layer). The agent 106 (i.e., the flow reporting application labeled "QoE app" in FIGS. 12A and 12B) receives the reporting configuration via the user plane TCP/IP communication flows (e.g., as a file transfer), interacts with the OS layer 105, e.g., via public APIs offered by the OS or by imbedded OS layer functions. The agent 106 executes the logging and sends the results (e.g., in a file transfer) back to the server via the regular TCP/IP communication flows.

The measurements of the MDT component 124 and the other RAN measurements (e.g., the PM component 122) are configured by the OAM component 136 via the standard protocols and interfaces specified by the third Generation Partnership Project (3GPP). The measurements are collected in a Trace Collecting Entity (TCE) 804 in the OAM component 136. Details on trace concepts and requirements are specified in the 3GPP TS 32.421 ("Subscriber and equipment trace", e.g., version 11.4.0). Details on trace control and configuration management are specified in 3GPP TS 32.422 ("Subscriber and equipment trace", e.g., version 11.5.0).

The service identification reports 600 and the optional service packet reports provide an end-to-end view of the user data transmission within the mobile communication network 100. The MDT reports from each of the MDT components 124 and 125 quantify the performance of the radio link. The measurements by each of the MDT components 124 and 125 complement the service identification reports 600, and optionally the service packet reports, with statistics on delay, jitter and loss caused by the radio link.

In a reduced embodiment combining only service identification reports 600 and MDT measurements, the association indicated in the service identification reports 600 allows estimating the QoE function and service performance, for example for each service. The MDT measurements are combined with the service identification reports 600 in the RAN 112 by receiving the service identification reports 600 from the agent 106 via the APIs 107 and the MDT component 125 at the MDT component 124. The service-specific MDT measurements resulting from this combination are reported via a standardized Northbound Interface 806 for telecommunication management (abbreviated by "Itf-N" for Northbound Interface) to the OAM component 136. Alternatively, the MDT measurements and the service identification reports 600 are combined at the OAM component 136.

By way of example, the MDT measurements are implemented in a data link layer 900 upstream of the radio link. FIG. 9 schematically illustrates the data link layer 900, which is implemented at the terminal 102 in case the MDT component 125 is present and at the RAN 112 in case the MDT component 124 is present. In the schematic illustration of sublayers 902, 904, 906, we assume a data flow from higher layers to the Packet Data Convergence Protocol sublayer 902 via the Radio Link Control sublayer 904 to the Medium Access Control sublayer 906 interfacing the physical layer. The MDT component 124 at the RAN 112 measures the downlink performance. The uplink performance of the data link layer link 900 implemented at the terminal 102 is measured by the MDT component 125.

A conventional MDT component collects data of automatic terminal-based measurements and logs the data. The data is used to replace a manual drive-testing that the operators would have to perform in the area covered by the network 104. The conventional MDT component evaluates the performance of the network 104 per physical location. In addition to the functionality of a conventional MDT component, the MDT component 124 and/or the MDT component 125 measures at least one of the performance quantities 908 to 916 indicated in FIG. 9.

The PDCP sublayer 902 receives Service Data Units (SDU), which are buffered separately for each Radio Bearer (RB) in buffers 918. The PDCP delay 908 is measured as the time from the arrival of the SDU at the buffers 918 until a first MAC segment of the SDU is successfully transmitted on the radio link. An alternative measurement of the PDCP delay includes the time until the PDCP SDU is acknowledged. For example in acknowledged transmission mode, the PDCP sublayer 902 keeps the SDU in the buffer 918 until receipt of the SDU is acknowledged by the peer in a PDCP status report.

The PDCP delay jitter 910 is measured as the difference in delay at the PDCP sublayer 902 between two consecutive PDCP SDUs.

An RLC delay 912 is measured as the time from the arrival of the RLC SDU at the RLC sublayer 904 until the RLC SDU is passed to the MAC sublayer 906 for transmission. The RLC delay 912 is also referred to as a queuing delay in the RLC sublayer 904.

An MAC delay 916 is measured as the time from the start of transmission of the MAC Packet Data Unit (PDU) until the MAC PDU is successfully acknowledged, or until a Hyprid-ARQ (HARQ) failure occurs. For example, a HARQ process initiated upon transmission of the MAC PDU awaits the receipt of the acknowledgment.

The MDT report further includes a number of PCDP SDU losses 914, which is defined as a number of PCDP SDUs that have been discarded or lost. The loss can be measured as the absence of an acknowledgement on the RLC sublayer 904.

At least some of the measurements 908 to 916 are collected per Radio Access Bearer (RAB) and are optionally also aggregated separately for each of the plurality of terminals 102 (i.e., on a per-UE level). In a reduced embodiment, at least the PDCP delay 908, the PDCP delay jitter 910 and the PDCP SDU loss 914 are measured. The other measurements 912 and 916 are optional features in an enhanced embodiment.

A downlink measurement of one or more of the measurement quantities 908 to 916 performed by the MDT component 124 is requested in an MDT trace job configuration. The MDT trace job configuration is submitted by the OAM component 136 via the standardized Itf-N interface 806 to the RAN 112. The MDT trace job configuration is passed to one or more of the components of the RAN 112 (e.g., to the eNodeB 120) using standard procedures. The RAN 112 starts performing the requested measurements in response to receipt of the configuration and collects the measurements in trace records. The collected trace records are delivered to the TCE 804.

For an uplink measurement of one or more of the measurement quantities 908 to 916 performed by the MDT component 125 in the terminal 102, the RAN 104 configures the terminal 102 using the CP signaling of the RRC protocol, so as to perform the requested measurements. The MDT configuration can be combined with the configuration of service flow reports described above. The configuration for the MDT component 125 specifies the requested measurements, and optionally the periodicity as a trigger of the MDT reports.

The terminal 102 collects the individual measurement samples separately for each of the measured quantities 908 to 916 of the Data Link Layer 900 into aggregates during the measurement period. In some embodiments of the MDT component 125, the aggregates include a sum and/or (probability) distribution, e.g., by means of binning the measured quantity. The MDT report is sent from the MDT component 125 either at the end of each measurement period or in a batch for several measurement periods.

Measurements for the downlink are taken in the RAN 112 with the same measurement periodicity used by the terminal 102 for uplink measurements. The MDT component 125 or a dedicated component in the RAN 112 aggregates the individual samples of the downlink measurements into aggregates. The aggregates used in the RAN 112 can be equivalent or similar to those defined above for the terminal 112. Results of the aggregation are recorded for each measurement period in a trace record. The MDT component 124 receives the terminal MDT report from the MDT component 125 and reports the RAN MDT measurements together with the terminal MDT report to the TCE 804.

When the DPI component 134 or the OAM component 136 detects a performance problem based on DPI measurements, the DPI component 134 or the OAM component 136 compares the DPI measurements with MDT measurements of the RAN 112 to identify problems within the core network 114 by excluding that the performance problem is caused by the RAN 112.

The service identification reporting and the optional service packet reporting are collectively referred to as service flow reporting. In advanced embodiments of the methods 200 and 300, the service flow reporting provided by the terminal 102 and performance reports provided by the network 104 are correlated. The performance reports provided by the network 104 optionally include the network MDT reports and the terminal MDT reports.

Details of the correlation depend on the network component used for implementing the correlation. In a reduced protocol architecture for implementing the technique, the service flow reports are carried within the terminal MDT reports (e.g., via the RRC protocol) from the terminal 102 to the RAN 112. In this case, the service flow reports already arrive in a correlated manner at the TCE 804.

As an example for correlated analysis in the course of the reporting of MDT measurements, the MDT component 124 of the RAN 112 also receives the service identification report 600 from the terminal 102, associates a service or process to the measured SDUs according to the service identification report 600 and separately aggregates the measurements for each service. The MDT report, which is sent from the RAN 112 to the OAM component 136, indicates jitter and delay caused in the RAN 112 separately for each service.

In both of the implementations of the correlation discussed below, the service flow reports and the terminal MDT reports are sent independently from the terminal 102 to the network 104. An advantage of this advanced protocol architecture is the reduced communication between higher and lower layers in the terminal 102, so that the agent 106 is more universal. The service flow reports and the terminal MDT reports are correlated only in the OAM component 136 during post-processing. By way of example, the terminal MDT reports are sent via CP protocols of the RAN 112 (i.e., via the RRC protocol), while service flow reports are sent "above" the CP RAN protocols in the UP of the Internet protocol suite (TCP/IP).

In an IP-based correlation, service flow reports and MDT reports are correlated based on an IP address, e.g., the IP address of the terminal 102. This necessitates that the IP address assigned to the terminal 102 is reported to the OAM component 136 or any other component collecting MDT and service flow reports (e.g., to the TCE 804 in 3GPP terminology). As the MME 130 has the IP address of the terminal 102, the MME 130 can send a mapping of trace session reference and trace recording session reference to IP address. A trigger for sending the mapping information is a Cell Traffic Trace message sent by the eNodeB 120 when a trace recording session and the MDT measurements are initiated for the terminal 102 by the eNodeB, e.g., in the area-based MDT cell trace.

According to current standard solution, the Cell Traffic Trace message is not always sent to the MME 130 due to privacy reason and a privacy indicator in the terminal 102 (e.g. in the UE context) determines whether the Cell Traffic Trace message should be sent to the MME 130 or not. Therefore a new value for the privacy indicator can be specified to further distinguish the case when IP address mapping information is needed. In case of this value of the privacy indicator, the eNodeB 120 always sends the Cell Traffic Trace message.

In case of IMSI- or IMEI-based MDT trace, the MME 130 triggers the trace activation to the eNodeB 120. The MME 130 sends the mapping of trace session reference and IP address to the TCE 804.

In the TCE 804, the trace reference in the MDT reports is associated with the IP address (based on the mapping received from the MME 130). The MDT reports are correlated to the service flow reports based on the IP address.

Alternatively or in combination with the IP-based correlation, the correlation is based on an identifier of the terminal 102, e.g., based on IMSI and/or IMEI. In an implementation, the IMSI and/or the IMEI are hashed.

The terminal 102 adds the IMSI and/or IMEI, or the hashed IMSI/IMEI information, to the service flow report. The IMSI/IMEI information can be obtained from the lower layers in the terminal 102. In the network 104, the MME 130 sends the mapping from trace reference to IMSI/IMEI (or hashed IMSI/IMEI) to the TCE 804, similarly as in the case of IP-based correlation.

As pointed out in the context of IP-based correlation, the Cell Traffic Trace message shall always be sent from the eNodeB 130 when an MDT measurement activation occurs. A new value of the privacy indicator field is defined indicating when (e.g., hashed) IMSI/IMEI mapping is needed. In case of this value of the privacy indicator, the eNodeB 120 sends the Cell Traffic Trace message.

The hashed IMSI/IMEI is configured in the terminal via the CN 114 (or the RAN 112) signaling when the terminal 102 attaches to the network 104 (similarly to sending a Temporary Mobile Subscriber Identity, TMSI, to the terminal 102).

The terminal agent 106 performing the reporting can be pre-installed on the device before it is sold, or the agent 106 can be installed by the user from an application distribution server (e.g., the "application market" of the OS 105). The agent 106 can also be part of a standardized solution, and is thus integrated into the original terminal software. The UP-based signaling combines well with the user-installed agent 106. The CP-based signaling combines well with a standardized agent 106.

At least some embodiments of the service flow reporting enable more detailed information about individual flows. However, same or all other embodiments do not enable identification of the end-user, and for privacy reasons, an end-user may also not want to enable such an identification. Some users may whish to exclude sending any service-flow information at all.

It is envisaged that the end-user has an opt-in/opt-out or on/off control possibility for the service flow reporting, and that even when activated certain aspects of the reporting can be controlled by the user.

For instance, a user might select to send service flow reports, but wishes to keep his identity private. In this way it is possible for the operator to do advanced application-related performance monitoring and trouble-shooting on a statistical level, while ensuring end-user privacy.

As has become apparent from above description of embodiments of the invention, at least some embodiments allow identifying the relation between applications in a terminal and data flows seen on the network side. This greatly improves the possibility of relevant performance monitoring for different applications, as well as discovering of application-dependent problems.

The invention has been described with reference to particular embodiments. However, it will be apparent to one skilled in the art that it is possible to embody the invention in specific forms other than those of the embodiments described above. Thus, the described embodiments are merely illustrative and should not be considered restrictive in any way. The scope of the present invention is only limited by the claims that follow.

The invention claimed is:

1. A method of identifying services for monitoring data traffic in a communication network including a terminal configured to transceive data traffic and a component configured to measure data traffic, the method comprising the steps performed by at least one hardware processor of the component of:
   receiving, from the terminal, a service identification report indicative of an association of one or more communication services executed or executable at the terminal with one or more communication endpoints, the service identification report including at least one timestamp;
   receiving, from the terminal, a service packet report including packet timestamps indicative of at least one of incoming time and outgoing time of data packets at the terminal for one of the communication services, wherein at least one of the service identification report, the service packet report and a separate time reference report is received from the terminal and includes a sending time, and wherein at least one of the at least one timestamp included in the service identification report and the packet timestamps included in the service packet report are adjusted based on a time difference between a receipt time at the component and the sending time reported by the terminal;
   associating measured data traffic to one or more of the communication services based on the service identification report;
   performing a statistical analysis of the measured traffic;
   differentiating a plurality of classes of communication services based on the statistical analysis; and
   performing an action based on the differentiating.

2. The method of claim 1, wherein at least one of a source socket, a destination socket, a socket pair and a communication protocol is derived from the measured data traffic and compared to the service identification report to identify the associated one or more communication services.

3. The method of claim 1, wherein at least one of outgoing time and incoming time, at the component, of data packets associated with the communication service are correlated to the reported packet timestamps.

4. A device for identifying services for monitoring data traffic in a communication network including a terminal configured to transceive data traffic and a component configured to measure data traffic, the device comprising:
   a processor; and
   a memory comprising instructions which when executed by the processor causes the processor to:
   receive, from the terminal, a service identification report indicative of an association of one or more communication services executed or executable at the terminal with one or more communication endpoints, the service identification report including at least one timestamp;
   receive, from the terminal, a service packet report including packet timestamps indicative of at least one of incoming time and outgoing time of data packets at the terminal for one of the communication services, wherein at least one of the service identification report, the service packet report and a separate time reference report is received from the terminal and includes a sending time, and wherein at least one of at least one timestamp included in the service identification report and the packet timestamps included in the service packet report are adjusted based on a time difference between a receipt time at the component and the sending time reported by the terminal;
   associate measured data traffic to one or more of the communication services based on the service identification report;
   perform a statistical analysis of the measured traffic;
   differentiate a plurality of classes of communication services based on the statistical analysis; and
   perform an action based on the differentiating.

5. The device of claim 4, wherein the device is installed at the component.

6. The device of claim 4, wherein the device comprises a network node and to perform the action based on the differentiating, the processor is configured to tailor a network capacity to the differentiation of the plurality of classes of communication services.

7. The device of claim 4, wherein the device comprises a network node and to perform the action based on the differentiating, the processor is configured to identify, for a user, communication services causing a monthly data quota of the user to be rapidly consumed.

8. The device of claim 4, wherein the device comprises a network node and to perform the action based on the differentiating, the processor is configured to discover a process executed at a terminal that uses the network above a threshold level to enable a user to determine whether to reconfigure or uninstall an application using the process.

* * * * *